US012613732B2

(12) United States Patent
Alexander et al.

(10) Patent No.: US 12,613,732 B2
(45) Date of Patent: Apr. 28, 2026

(54) INITIALISATION OF WORKER THREADS AND ASSOCIATED OPERAND REGISTERS

(71) Applicant: Graphcore Limited, Bristol (GB)

(72) Inventors: Alan Alexander, Wotton-Under-Edge (GB); Stephen Felix, Bristol (GB); Edward Andrews, Bristol (GB); Godfrey Da Costa, Bristol (GB)

(73) Assignee: GRAPHCORE LIMITED, Bristol (GB)

( * ) Notice: Subject to any disclaimer, the term of this patent is extended or adjusted under 35 U.S.C. 154(b) by 26 days.

(21) Appl. No.: 18/050,673

(22) Filed: Oct. 28, 2022

(65) Prior Publication Data

US 2023/0214255 A1 Jul. 6, 2023

(30) Foreign Application Priority Data

Dec. 31, 2021 (GB) ...................................... 2119132

(51) Int. Cl.
*G06F 9/48* (2006.01)
*G06F 9/30* (2018.01)
*G06F 9/38* (2018.01)

(52) U.S. Cl.
CPC .......... *G06F 9/4806* (2013.01); *G06F 9/3851* (2013.01); *G06F 9/3887* (2013.01); *G06F 9/3888* (2023.08)

(58) Field of Classification Search
CPC .... G06F 9/4806; G06F 9/3887; G06F 9/3888; G06F 9/30123; G06F 9/3851; G06F 9/3009
See application file for complete search history.

(56) References Cited

U.S. PATENT DOCUMENTS

| | | | |
|---|---|---|---|
| 2012/0017062 A1* | 1/2012 | Goel | ................... G06F 15/8007 |
| | | | 712/30 |
| 2015/0154027 A1 | 6/2015 | Lerner | |
| 2016/0259668 A1* | 9/2016 | Glauert | .................... G06T 1/20 |
| 2018/0267932 A1* | 9/2018 | Zhu | ........................ G06F 9/3808 |

(Continued)

FOREIGN PATENT DOCUMENTS

| | | |
|---|---|---|
| EP | 2884388 A1 | 6/2015 |
| JP | 2019079530 A | 5/2019 |
| JP | 2020107306 A | 7/2020 |

OTHER PUBLICATIONS

Search Report dated Aug. 24, 2022 for United Kingdom Patent Application No. GB22119132.5 3 pages.

(Continued)

*Primary Examiner* — Shawn Doman
(74) *Attorney, Agent, or Firm* — HAYNES AND BOONE, LLP

(57) ABSTRACT

A processing device comprising: at least one execution unit configured to interleave execution of a plurality of worker threads, wherein each of the worker threads is configured to execute a same set of code to perform operations on a different set of data held in an input buffer of a memory of the processing device and output the results data to an output buffer. An instruction is executed so as to cause a plurality of operand registers, each of which is associated with one of the worker threads, to be populated with one or more variables enabling each worker to determine where in the input buffer is located its set of input data and where to store its results data.

38 Claims, 14 Drawing Sheets

M worker contexts

(56) References Cited

U.S. PATENT DOCUMENTS

| | | | |
|---|---|---|---|
| 2019/0155648 A1 | 5/2019 | Knowles | |
| 2020/0174828 A1* | 6/2020 | Manula | G06F 9/3877 |
| 2020/0192676 A1* | 6/2020 | Pearce | G06F 9/5038 |
| 2020/0225960 A1 | 7/2020 | Alexander | |
| 2020/0233670 A1* | 7/2020 | Alexander | G06N 3/08 |
| 2021/0271527 A1 | 9/2021 | Wilkinson et al. | |

OTHER PUBLICATIONS

Office Acton dated Oct. 29, 2025 for Japanese Patent Application No. 2024-539304. 2 pages.

\* cited by examiner

Memory Address

600

850

$W_5$ $W_4$ $W_3$ $W_2$ $W_1$ $W_0$

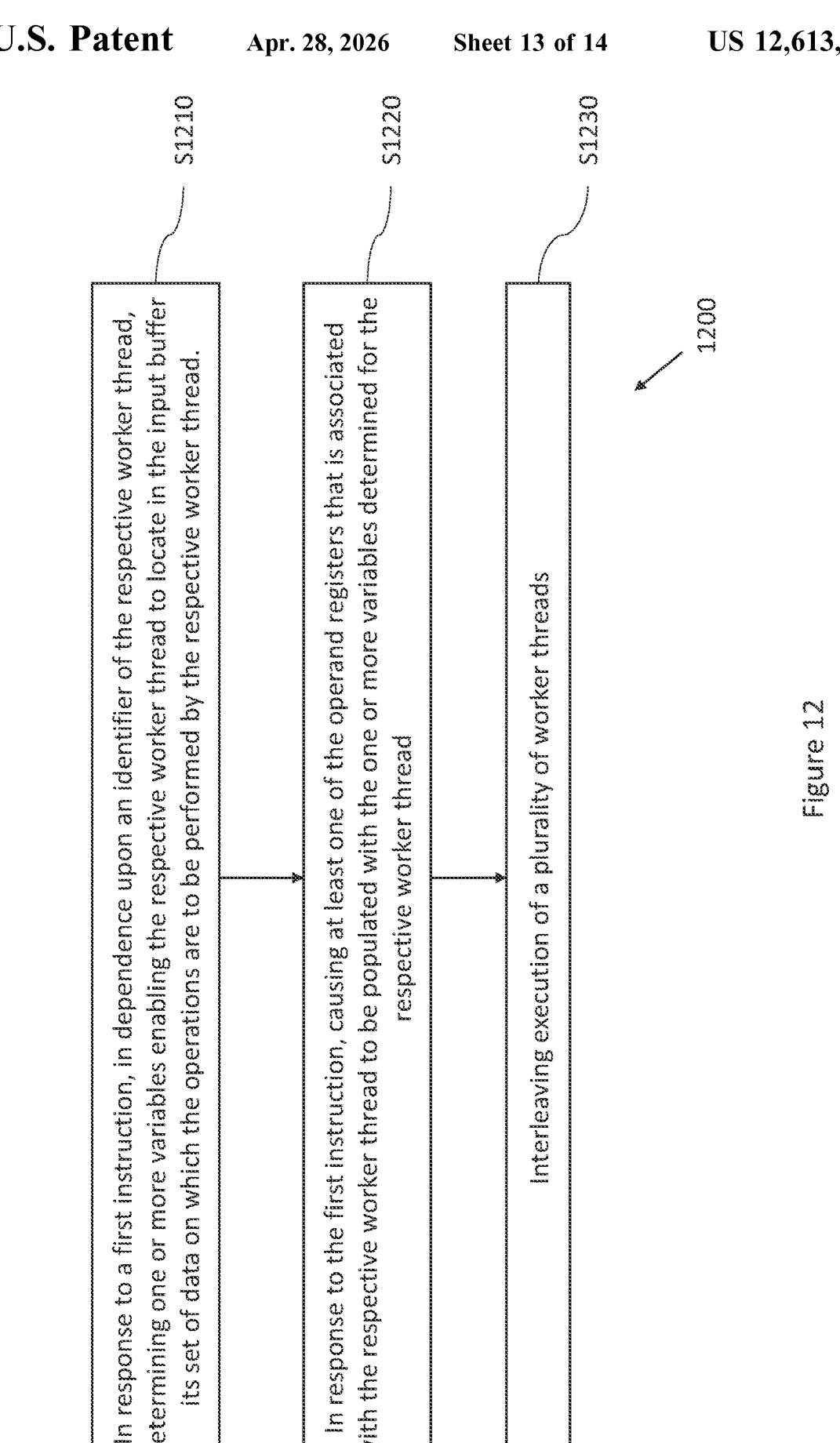

S1210

In response to a first instruction, in dependence upon an identifier of the respective worker thread, determining one or more variables enabling the respective worker thread to locate in the input buffer its set of data on which the operations are to be performed by the respective worker thread.

S1220

In response to the first instruction, causing at least one of the operand registers that is associated with the respective worker thread to be populated with the one or more variables determined for the respective worker thread

S1230

Interleaving execution of a plurality of worker threads

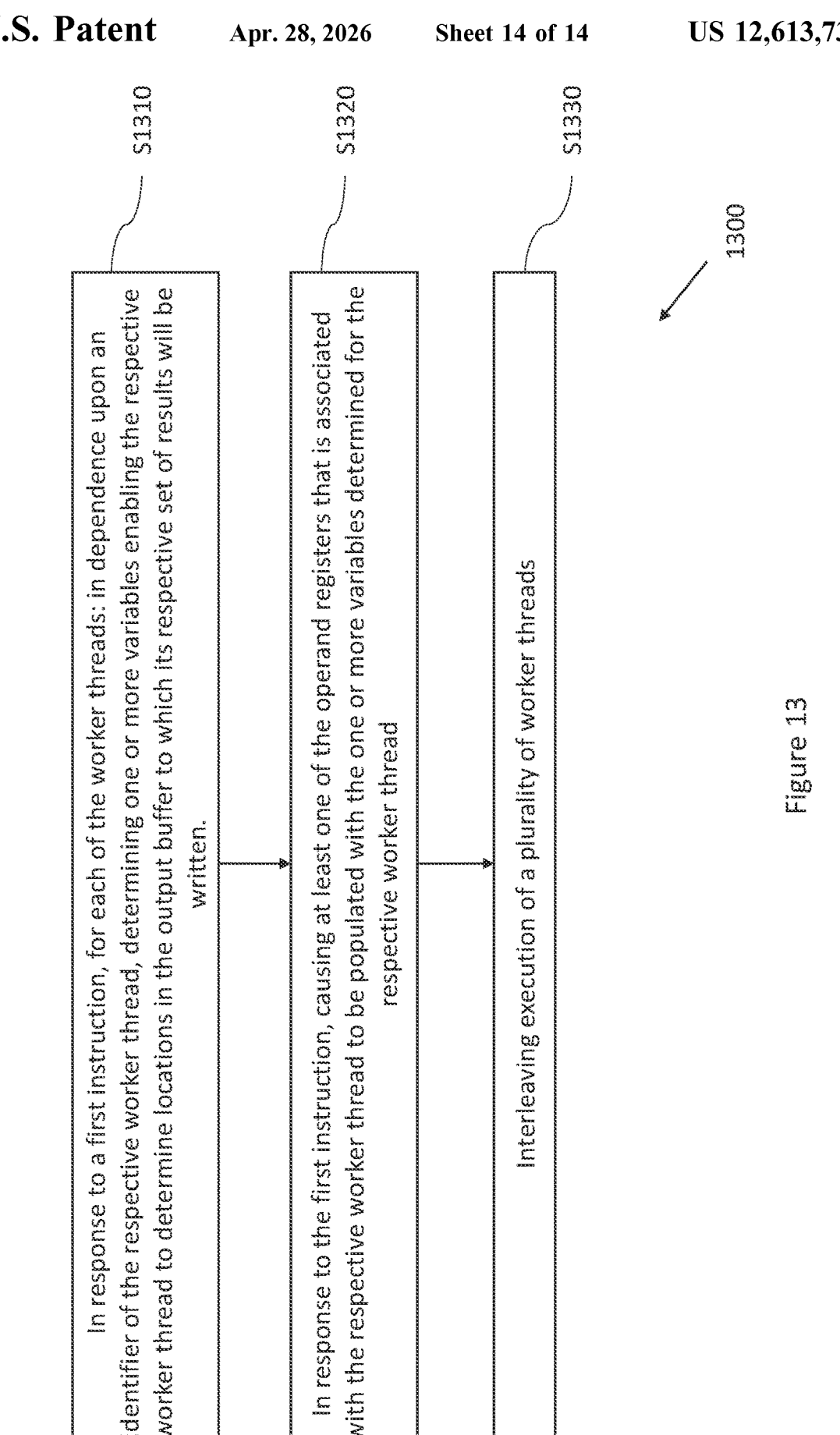

S1310

In response to a first instruction, for each of the worker threads: in dependence upon an identifier of the respective worker thread, determining one or more variables enabling the respective worker thread to determine locations in the output buffer to which its respective set of results will be written.

S1320

In response to the first instruction, causing at least one of the operand registers that is associated with the respective worker thread to be populated with the one or more variables determined for the respective worker thread

S1330

Interleaving execution of a plurality of worker threads

INITIALISATION OF WORKER THREADS AND ASSOCIATED OPERAND REGISTERS

CROSS-REFERENCE TO RELATED APPLICATIONS

The present application claims priority to United Kingdom Patent Application No. GB2119132.5, filed Dec. 31, 2021, the disclosure of which is hereby incorporated herein by reference in its entirety.

TECHNICAL FIELD

The present disclosure relates to a processing device comprising at least one execution unit and, in particular, to a processing device comprising at least one execution unit configured to interleave execution of a plurality of worker threads.

BACKGROUND

A multi-threaded processor is a processor which is capable of executing multiple program threads alongside one another. The processor may comprise some hardware that is common to the multiple different threads (e.g. a common instruction memory, data memory and/or execution unit); but to support the multi-threading, the processor also comprises some dedicated hardware specific to each thread.

The dedicated hardware comprises at least a respective context register file for each of the number of threads that can be executed at once. A "context", when talking about multi-threaded processors, refers to the program state of a respective one of the threads being executed alongside one another (e.g. program counter value, status and current operand values). The context register file refers to the respective collection of registers for representing this program state of the respective thread. Registers in a register file are distinct from general memory in that register addresses are fixed as bits in instruction words, whereas memory addresses can be computed by executing instructions. The registers of a given context typically comprise a respective program counter for the respective thread, and a respective set of operand registers for temporarily holding the data acted upon and output by the respective thread during the computations performed by that thread. Each context may also have a respective status register for storing a status of the respective thread (e.g. whether it is paused or running). Thus each of the currently running threads has its own separate program counter, and optionally operand registers and status register(s).

One possible form of multi-threading is parallelism. That is, as well as multiple contexts, multiple execution pipelines are provided: i.e. a separate execution pipeline for each stream of instructions to be executed in parallel. Another form of multi-threaded processor employs concurrency rather than parallelism, whereby the threads share a common execution pipeline (or at least a common part of a pipeline) and different threads are interleaved through this same, shared execution pipeline. Performance of a multi-threaded processor may still be improved compared to no concurrency or parallelism, thanks to increased opportunities for hiding pipeline latency. Also, this approach does not require as much extra hardware dedicated to each thread as a fully parallel processor with multiple execution pipelines, and so does not incur so much extra silicon.

SUMMARY

In some cases, a multi-threaded processor may be applied in a data parallel manner, where each worker thread executes a same set of code to perform operations on a different set of data. In this case, each worker needs to locate its associated set of data in memory in order to perform the operations. Having each worker individually execute a set of instructions in order to determine the location of its associated set of data may consume a significant number of processors clock cycles, thus increasing the length of time until completion of the operations.

According to embodiments, there is provided a processing device comprising: at least one execution unit configured to interleave execution of a plurality of worker threads, wherein each of the worker threads is configured to execute a same set of code to perform operations on a different set of data held in an input buffer of a memory of the processing device; and a plurality of operand registers, each of which is associated with one of the worker threads and is configured to store at least one operand for at least one instruction executed by its associated one of the worker threads, wherein the at least one execution unit comprises a hardware module comprising processing circuitry configured to, in response to a first instruction, which is executed by the at least one execution unit prior to execution of the same set of code, for each of the worker threads: in dependence upon an identifier of the respective worker thread, determine one or more variables enabling the respective worker thread to locate in the input buffer its set of data on which the operations are to be performed by the respective worker thread; and cause at least one of the operand registers that is associated with the respective worker thread to be populated with the one or more variables determined for the respective worker thread.

The inventors have realised that in the case of data parallel operations, a hardware module responsive to a single instruction can be provided to pre-load the worker operand registers with the variables enabling them to identify the memory locations for the set of data on which they are to operate. Since the workers each perform the same set of operations, it is sufficient for the hardware module to use the worker identifiers in order to determine the differences in location of the data sets for each of the workers.

In some embodiments, for each of the worker threads, the one or more variables comprises an offset into the input buffer at which at least one item of that worker thread's set of data is stored.

In some embodiments, each of the worker threads is configured to execute a load instruction to load an item of its set of data from a memory location given by the offset for that worker thread.

In some embodiments, for each of the worker threads: the at least one item of the respective worker thread's set of data comprises a first item that is to be accessed first in sequence by the respective worker thread.

In some embodiments, for each of the worker threads, the respective operations comprise a same set of operations executed repeatedly in a loop, wherein each of the worker threads is configured to: execute each iteration of the loop on a different one of a plurality of subsets of its set of data.

In some embodiments, for each of the worker threads, the one or more variables comprises an iteration count indicating a number of iterations of the loop to be performed by the respective worker thread, wherein each of the worker threads is configured to continue loading data from the input buffer, until a number of completed iterations of the loop by that worker thread matches the iteration count for that worker thread.

In some embodiments, each of the worker threads is configured to, when executing the same set of code: between each iteration of the loop, increment a pointer to point to a starting address of a next one of the subsets of its set of data.

In some embodiments, the processing device comprises a further register storing control information enabling the processing circuitry to, for each of the worker threads, determine the one or more variables for the respective worker thread.

In some embodiments, the control information comprises an indication as to whether or not: for each of the worker threads, the associated at least one of the operand registers is populated with the respective one or more variables for that worker thread in response to execution of the first instruction; or each of the worker threads individually determines its respective one or more variables enabling it to locate in the input buffer its set of data.

In some embodiments, the execution unit is configured to, prior to execution of the first instruction, execute a separate instruction to load the control information into the further register.

In some embodiments, the processing circuitry is configured to receive a set of input information enabling it to, for each of the worker threads, determine the one or more variables for the respective worker thread, wherein the input information comprises one or more of: a size of the input buffer in which is stored each of the sets of data for the worker threads; and a size of subsets of each of the sets of data with respect to which the worker threads are configured to perform a single iteration of a same subset of the operations performed repeatedly in a loop.

In some embodiments, the processing circuitry is configured to, for each of the worker threads: determine the respective iteration count in dependence upon the size of the input buffer and a number of the worker threads.

In some embodiments, the processing circuitry is configured to, for each of the worker threads: determine the respective offset in dependence at least upon: the size of the subsets of each of the sets of data; and a number of the worker threads.

In some embodiments, the input information comprises the control information.

In some embodiments, the processing circuitry is configured to receive an indication as to one of a set of data layout modes for the input buffer and in dependence upon, the indication of the one of the set of data layout modes, select a set of calculations to be performed in order to determine the one or more variables.

In some embodiments, the data layout modes include at least one of: an interleaved mode in which data belonging to different ones of the worker threads is interleaved in the input buffer; and a separated mode in which, for each worker thread, the set of data for that worker thread is located in a single contiguous region of the input buffer.

According to a second aspect, there is provided a processing device comprising: at least one execution unit configured to interleave execution of a plurality of worker threads, wherein each of the worker threads is configured to: execute a same set of code to perform operations on a different set of input data to produce a different set of results; store its set of results from the operations to an output buffer of a memory of the processing device; and a plurality of operand registers, each of which is associated with one of the worker threads and is configured to store at least one operand for at least one instruction executed by its associated one of the worker threads, wherein the at least one execution unit comprises a hardware module comprising processing circuitry configured to, in response to a first instruction, which is executed by the at least one execution unit prior to execution of the same set of code, for each of the worker threads: in dependence upon an identifier of the respective worker thread, determine one or more variables enabling the respective worker thread to determine locations in the output buffer to which its respective set of results will be written; and cause at least one of the operand registers that is associated with the respective worker thread to be populated with the one or more variables determined for the respective worker thread.

The inventors have realised that in the case of data parallel operations, a hardware module responsive to a single instruction can be provided to pre-load the worker operand registers with the variables enabling them to identify the memory locations to which they will write results of their processing. Since the workers each perform the same set of operations, it is sufficient for the hardware module to use the worker identifiers in order to determine the differences in location for the results for each of the workers. The first and second aspect represent closely related to alternative solutions to the same technical problem.

In some embodiments, for each of the worker threads, the one or more variables comprises a memory address value enabling the respective worker thread to identify one of the locations in the output buffer to which part of the respective set of results will be written.

In some embodiments, for each of the worker threads, the respective memory address value is an offset value for an item of the input data for that worker thread, wherein each of the worker threads is configured to identify the one of the locations in the output buffer by scaling the memory address to obtain an offset value into the output buffer.

In some embodiments, each of the worker threads is configured to execute a store instruction to store an item of its set of results to a memory location identified by the offset value for the respective worker thread.

In some embodiments, for each of the worker threads, the respective operations comprises a same set of operations executed repeatedly in a loop, wherein each of the worker threads is configured to: execute each iteration of the loop to produce a different subset of its respective set of results.

In some embodiments, for each of the worker threads, the one or more variables comprises an iteration count indicating a number of iterations of the loop to be performed by the respective worker thread, wherein each of the worker threads is configured to continue storing its set of results until a number of completed iterations of the loop by that worker thread matches the iteration count for that worker thread.

In some embodiments, each of the worker threads is configured to, when executing the same set of code: between each iteration of the loop, increment a pointer to point to a starting address of a next part of the memory to which a next subset of its respective set of results is to be stored.

In some embodiments, the processing device comprises a further register storing control information enabling the processing circuitry to, for each of the worker threads, determine the one or more variables for the respective worker thread.

In some embodiments, the control information comprises an indication as to whether or not: for each of the worker threads, at least one of the operand registers is populated with the respective one or more variables for that worker thread in response to execution of the first instruction; or each of the worker threads individually determines its respective one or more variables.

In some embodiments, the at least one execution unit is configured to, prior to execution of the first instruction, execute a separate instruction to load the control information into the further register.

In some embodiments, the processing circuitry is configured to receive a set of input information enabling it to, for each of the worker threads, determine the one or more variables for the respective worker thread, wherein the input information comprises one or more of: a size of an input buffer containing each of the different sets of input data; and a size of each of a plurality of subsets of the sets of results, wherein one of the worker threads is configured to produce one of the subsets in response to performing a single iteration of a same set of operations repeatedly in a loop.

In some embodiments, the processing circuitry is configured to, for each of the worker threads: determine the respective iteration count in dependence upon the size of the input buffer and a number of the worker threads.

In some embodiments, the processing circuitry is configured to, for each of the worker threads: determine the respective memory address value in dependence at least upon: the size of each of the subsets; and a number of the worker threads.

In some embodiments, the input information comprises the control information.

In some embodiments, the processing circuitry is configured to receive an indication as to one of a set of data layout modes for the output buffer and in dependence upon the indication of the one of the set of data layout modes, select a set of calculations to be performed in order to determine the one or more variables.

In some embodiments, the data layout modes include at least one of: an interleaved mode in which the sets of results belonging to different ones of the worker threads are interleaved in the output buffer; and a separated mode in which, for each worker thread, the set of results data for that worker thread is stored to a single contiguous region of the output buffer.

In some embodiments, the at least one execution unit is arranged to run a supervisor thread in addition to the plurality of worker threads, wherein the supervisor thread is configured to execute the first instruction prior to launching of the worker threads.

In some embodiments, the first instruction causes the launching of the worker threads.

In some embodiments, the further register is a register of the supervisor thread.

In some embodiments, the execution unit is configured to: execute each of the worker threads in a repeating sequence, the sequence consisting of a plural number of time slots in which the at least one execution unit is operable to interleave the execution of the worker threads.

In some embodiments, the execution unit is configured to: prior to launching of the worker threads, run the supervisor thread in each of the different time slots; and in response to execution of the first instruction, enable the supervisor thread to relinquish each of the time slots in which it is running to one of the worker threads.

In some embodiments, the at least one execution unit comprises a plurality of execution units, wherein a first of the execution units comprises the hardware module and is configured to execute the first instruction, wherein a second of the execution units is configured to perform arithmetic operations on the sets of data loaded from the memory.

According to a third aspect, there is provided a method comprising: interleaving execution of a plurality of worker threads, wherein each of the worker threads is configured to execute a same set of code to perform operations on a different set of data held in an input buffer of a memory of the processing device; in response to a first instruction, which is executed prior to execution of the same set of code, for each of the worker threads: in dependence upon an identifier of the respective worker thread, determining one or more variables enabling the respective worker thread to locate in the input buffer its set of data on which the operations are to be performed by the respective worker thread; and causing at least one operand register that is associated with the respective worker thread to be populated with the one or more variables determined for the respective worker thread.

In some embodiments, for each of the worker threads, the one or more variables comprises an offset into the input buffer at which at least one item of that worker thread's set of data is stored.

In some embodiments, the method comprises: each of the worker threads executing a load instruction to load an item of its set of data from a memory location given by the offset for that worker thread.

In some embodiments, for each of the worker threads: the at least one item of the respective worker thread's set of data comprises a first item that is to be accessed first in sequence by the respective worker thread.

In some embodiments, for each of the worker threads, the respective operations comprise a same set of operations executed repeatedly in a loop, wherein the method comprises, each of the worker threads executing each iteration of the loop on a different one of a plurality of subsets of its set of data.

In some embodiments, for each of the worker threads, the one or more variables comprises an iteration count indicating a number of iterations of the loop to be performed by the respective worker thread, wherein the method comprises, each of the worker threads continuing to load data from the input buffer until a number of iterations of the loop completed by that worker thread matches the iteration count for that worker thread.

In some embodiments, the method comprises, each of the worker threads, when executing the same set of code: between each iteration of the loop, incrementing a pointer to point to a starting address of a next one of the subsets of its set of data.

In some embodiments, the method comprises storing control information in a further register, the control register enabling for each of the worker threads, the determination of the one or more variables for the respective worker thread.

In some embodiments, the control information comprises an indication as to whether or not: for each of the worker threads, the associated at least one of the operand registers is populated with the respective one or more variables for that worker thread in response to execution of the first instruction; or each of the worker threads individually determines its respective one or more variables enabling it to locate in the input buffer its set of data.

In some embodiments, the method comprises: prior to execution of the first instruction, execute a separate instruction to load the control information into the further register.

In some embodiments, the method comprises receiving a set of input information enabling it to, for each of the worker threads, determine the one or more variables for the respective worker thread, wherein the input information comprises one or more of: a size of the input buffer in which is stored each of the sets of data for the worker threads; and a size of subsets of each of the sets of data with respect to which the worker threads are configured to perform a single iteration of a same subset of the operations performed repeatedly in a loop.

In some embodiments, the method comprises, for each of the worker threads: determining the respective iteration count in dependence upon the size of the input buffer and a number of the worker threads.

In some embodiments, the method comprises, for each of the worker threads: determining the respective offset in dependence at least upon: the size of the subsets of each of the sets of data; and a number of the worker threads.

In some embodiments, the input information comprises the control information.

In some embodiments, the method comprises receiving an indication as to one of a set of data layout modes for the input buffer and in dependence upon the indication of the one of the set of data layout modes, select a set of calculations to be performed in order to determine the one or more variables.

In some embodiments, the data layout modes include at least one of: an interleaved mode in which data belonging to different ones of the worker threads is interleaved in the input buffer; and a separated mode in which, for each worker thread, the set of data for that worker thread is located in a single contiguous region of the input buffer.

According to a fourth aspect, there is provided a computer program comprising computer readable instructions, which when executed by at least one processor cause a method according to the third aspect or any embodiment thereof to be performed.

According to a fifth aspect, there is provided a non-transitory computer readable medium storing a computer program comprising computer readable instructions, which when executed by at least one processor cause a method according to the fourth aspect or any embodiment thereof to be performed.

According to a sixth aspect, there is provided a method comprising: interleaving execution of a plurality of worker threads, wherein each of the worker threads is configured to: execute a same set of code to perform operations on a different set of input data to produce a different set of results; and store its set of results to an output buffer of a memory of a processing device; and in response to a first instruction, which is executed prior to execution of the same set of code, for each of the worker threads: in dependence upon an identifier of the respective worker thread, determining one or more variables enabling the respective worker thread to determine locations in the output buffer to which its respective set of results will be written; and causing at least one operand register that is associated with the respective worker thread to be populated with the one or more variables determined for the respective worker thread.

In some embodiments, for each of the worker threads, the one or more variables comprises a memory address value enabling the respective worker thread to identify one of the locations in the output buffer to which part of the respective set of results will be written.

In some embodiments, for each of the worker threads, the respective memory address value is an offset value for an item of the input data for that worker thread, wherein the method comprises, for each of the worker threads, identifying the one of the locations in the output buffer by scaling the memory address to obtain an offset value into the output buffer.

In some embodiments, the method comprises each of the worker threads executing a store instruction to store an item of its set of results to a memory location identified by the offset value for the respective worker thread.

In some embodiments, for each of the worker threads, the respective operations comprises a same set of operations executed repeatedly in a loop, wherein the method comprises for each of the worker threads, executing each iteration of the loop to produce a different subset of its respective set of results.

In some embodiments, for each of the worker threads, the one or more variables comprises an iteration count indicating a number of iterations of the loop to be performed by the respective worker thread, wherein the method comprise, each of the worker threads is continuing to store it set of results until a number of completed iterations of the loop by that worker thread matches the iteration count for that worker thread.

In some embodiments, the method comprises each of the worker threads when executing the same set of code: between each iteration of the loop, incrementing a pointer to point to a starting address of a next part of the memory to which a next subset of its respective set of results is to be stored.

In some embodiments, storing in a further register, control information enabling, for each of the worker threads, determination of the one or more variables for the respective worker thread.

In some embodiments, the control information comprises an indication as to whether or not: for each of the worker threads, at least one of the operand registers is populated with the respective one or more variables for that worker thread in response to execution of the first instruction; or each of the worker threads individually determines its respective one or more variables.

In some embodiments, the method comprises, prior to execution of the first instruction, execute a separate instruction to load the control information into the further register.

In some embodiments, the method comprises receiving a set of input information enabling, for each of the worker threads, the determination of the one or more variables for the respective worker thread, wherein the input information comprises one or more of: a size of an input buffer containing each of the different sets of input data; and a size of each of a plurality of subsets of the sets of results, wherein the method comprises one of the worker threads producing one of the subsets in response to performing a single iteration of a same set of operations repeatedly in a loop.

In some embodiments, the method comprises, for each of the worker threads: determining the respective iteration count in dependence upon the size of the input buffer and a number of the worker threads.

In some embodiments, the method comprises for each of the worker threads: determining the respective memory address value in dependence at least upon: the size of each of the subsets; and a number of the worker threads.

In some embodiments, the input information comprises the control information.

In some embodiments, the method comprises: receiving an indication as to one of a set of data layout modes for the output buffer and in dependence upon the indication of the one of the set of data layout modes, select a set of calculations to be performed in order to determine the one or more variables.

In some embodiments, the data layout modes include at least one of: an interleaved mode in which the sets of results belonging to different ones of the worker threads are interleaved in the output buffer; and a separated mode in which, for each worker thread, the set of results data for that worker thread is stored to a single contiguous region of the output buffer.

In some embodiments, the method comprising running a supervisor thread in addition to the plurality of worker threads, wherein the supervisor thread is configured to execute the first instruction prior to launching of the worker threads.

In some embodiments, the first instruction causes the launching of the worker threads.

In some embodiments, the further register is a register of the supervisor thread.

In some embodiments, the method comprises executing each of the worker threads in a repeating sequence, the sequence consisting of a plural number of time slots in execution of the worker threads is interleaved.

In some embodiments, the method comprises, prior to launching of the worker threads, running the supervisor thread in each of the different time slots; and in response to execution of the first instruction, enabling the supervisor thread to relinquish each of the time slots in which it is running to one of the worker threads.

In some embodiments, the method comprises: executing the first instruction using a first of the execution units comprising the hardware module; and performing arithmetic operations on the sets of data loaded from the memory using a second of the execution units.

According to a seventh aspect, there is provided a computer program comprising computer readable instructions, which when executed by at least one processor cause a method according to the sixth aspect or any embodiment thereof to be performed.

According to an eighth aspect, there is provided a non-transitory computer readable medium storing a computer program comprising computer readable instructions, which when executed by at least one processor cause a method according to the seventh aspect or any embodiment thereof to be performed.

BRIEF DESCRIPTION OF DRAWINGS

For a better understanding of the present invention and to show how the same may be carried into effect, reference will now be made by way of example to the accompanying Figures in which:

FIG. 12 illustrates a first method according to embodiments of the application; and FIG. 13 illustrates a second method according to embodiments of the application.

DETAILED DESCRIPTION

Embodiments are directed to a processing device comprising at least one execution unit that is configured to interleave the execution of a plurality of worker threads. This processing device may take the form of a tile belonging to a multi-tile processing unit. An example of such a multi-tile processing unit is described in more detail in U.S. application Ser. No. 16/276,834, which is incorporated by reference.

Figure 1:
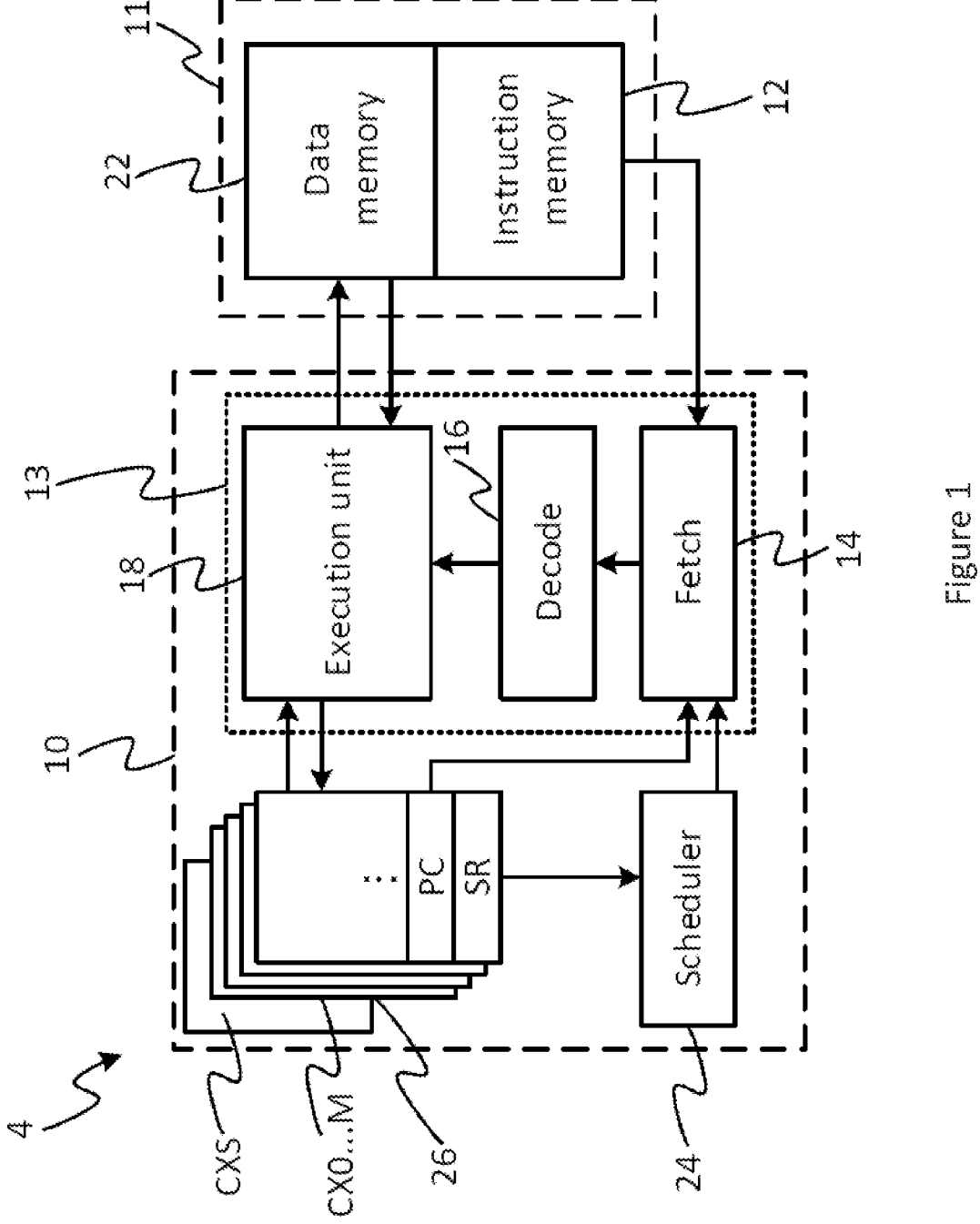
FIG. 1 is a schematic diagram of a processing device in accordance with embodiments of the application.

FIG. 1 illustrates an example of a processing device 4 in accordance with embodiments of the present disclosure. The processing device 4 may be one of an array of like processor tiles 4 on a same chip. The processing device 4 comprises a multi-threaded processing unit 10 in the form of a barrel-threaded processing unit, and a local memory 11 (i.e. on the same tile in the case of a multi-tile array, or same chip in the case of a single-processor chip). A barrel-threaded processing unit is a type of multi-threaded processing unit in which the execution time of the pipeline is divided into a repeating sequence of interleaved time slots, each of which can be owned by a given thread. This will be discussed in more detail shortly. The memory 11 comprises an instruction memory 12 and a data memory 22 (which may be implemented in different addressable memory unit or different regions of the same addressable memory unit). The instruction memory 12 stores machine code to be executed by the processing unit 10, whilst the data memory 22 stores both data to be operated on by the executed code and data output by the executed code (e.g. as a result of such operations).

The memory 12 stores a variety of different threads of a program, each thread comprising a respective sequence of instructions for performing a certain task or tasks. Note that an instruction as referred to herein means a machine code instruction, i.e. an instance of one of the fundamental instructions of the processor's instruction set, consisting of a single opcode and zero or more operands.

The program described herein comprises a plurality of worker threads, and a supervisor subprogram which may be structured as one or more supervisor threads. These will be discussed in more detail shortly. In embodiments, each of some or all of the worker threads takes the form of a respective "codelet". A codelet is a particular type of thread, sometimes also referred to as an "atomic" thread. It has all the input information it needs to execute from the beginning of the thread (from the time of being launched), i.e. it does not take any input from any other part of the program or from memory after being launched. Further, no other part of the program will use any outputs (results) of the thread until it has terminated (finishes). Unless it encounters an error, it is guaranteed to finish. N.B. some literature also defines a codelet as being stateless, i.e. if run twice it could not inherit any information from its first run, but that additional definition is not adopted here. Note also that not all of the worker threads need be codelets (atomic), and in embodiments some or all of the workers may instead be able to communicate with one another.

Within the processing unit 10, multiple different ones of the threads from the instruction memory 12 can be interleaved through a single execution pipeline 13 (though typically only a subset of the total threads stored in the instruction memory can be interleaved at any given point in the overall program). The multi-threaded processing unit 10 comprises: a plurality of context register files 26 each arranged to represent the state (context) of a different respective one of the threads to be executed concurrently; a shared execution pipeline 13 that is common to the concurrently executed threads; and a scheduler 24 for scheduling the concurrent threads for execution through the shared pipeline in an interleaved manner, preferably in a round robin manner. The processing unit 10 is connected to a shared instruction memory 12 common to the plurality of threads, and a shared data memory 22 that is again common to the plurality of threads.

The execution pipeline 13 comprises a fetch stage 14, a decode stage 16, and an execution stage 18 comprising an execution unit which may perform arithmetic and logical operations, address calculations, load and store operations, and other operations, as defined by the instruction set architecture. As will be described, in embodiments, the processing device comprises multiple such execution pipelines 13 and execution units 18. However, for simplification, FIG. 1 shows only one such execution pipeline 13 and execution unit 18. Each of the context register files 26 comprises a respective set of registers for representing the program state of a respective thread.

Figure 2:
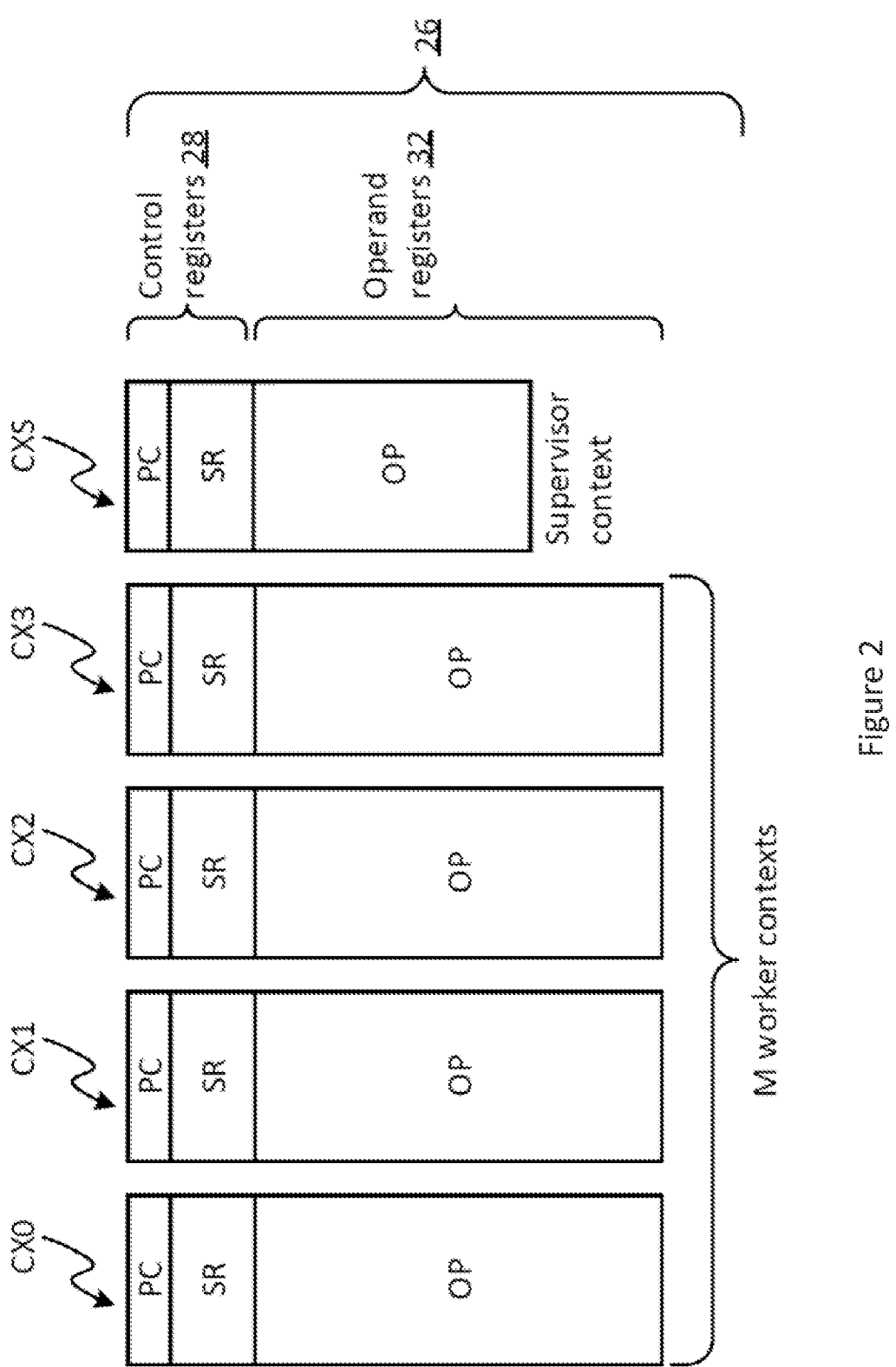
FIG. 2 is a schematic block diagram of a plurality of thread contexts.

An example of the registers making up each of the context register files 26 is illustrated schematically in FIG. 2. Each of the context register files 26 comprises a respective one or more control registers 28, comprising at least a program counter (PC) for the respective thread (for keeping track of the instruction address at which the thread is currently executing), and in embodiments also a set of one or more status registers (SR) recording a current status of the respective thread (such as whether it is currently running or paused, e.g. because it has encountered an error). Each of the context register files 26 also comprises a respective set of operand registers (OP) 32, for temporarily holding operands of the instructions executed by the respective thread, i.e. values operated upon or resulting from operations defined by the opcodes of the respective thread's instructions when executed. It will be appreciated that each of the context register files 26 may optionally comprise a respective one or more other types of register (not shown). Note also that whilst the term "register file" is sometimes used to refer to a group of registers in a common address space, this does not necessarily have to be the case in the present disclosure and each of the hardware contexts 26 (each of the register sets 26 representing each context) may more generally comprise one or multiple such register files.

As will be discussed in more detail later, the disclosed arrangement has one worker context register file CX0 . . . CX(M–1) for each of the number M of threads that can be executed concurrently (M=3 in the example illustrated but this is not limiting), and one additional supervisor context register file CXS. The worker context register files are reserved for storing the contexts of worker threads, and the supervisor context register file is reserved for storing the context of a supervisor thread. Note that in embodiments the supervisor context is special, in that it has a different number of registers than each of the workers. Each of the worker contexts preferably have the same number of status registers and operand registers as one another. In embodiments the supervisor context may have fewer operand registers than each of the workers. Examples of operand registers the worker context may have that the supervisor does not include: floating point registers, accumulate registers, and/or dedicated weight registers (for holding weights of a neural network). In embodiments the supervisor may also have a different number of status registers. Further, in embodiments the instruction set architecture of the processing device 4 may be configured such that the worker threads and supervisor thread(s) execute some different types of instruction but also share some instruction types.

The fetch stage 14 is connected so as to fetch instructions to be executed from the instruction memory 12, under control of the scheduler 24. The scheduler 24 is configured to control the fetch stage 14 to fetch an instruction from each of a set of concurrently executing threads in turn in a repeating sequence of time slots, thus dividing the resources of the pipeline 13 into a plurality of temporally interleaved time slots, as will be discussed in more detail shortly. For example, the scheduling scheme could be round-robin or weighted round-robin. Another term for a processor operating in such a manner is a barrel threaded processor.

In some embodiments, the scheduler 24 may have access to one of the status registers SR of each thread indicating whether the thread is paused, so that the scheduler 24 in fact controls the fetch stage 14 to fetch the instructions of only those of the threads that are currently active In embodiments, preferably each time slot (and corresponding context register file) is always owned by one thread or another, i.e. each slot is always occupied by some thread, and each slot is always included in the sequence of the scheduler 24; though the thread occupying any given slot may happen to be paused at the time, in which case when the sequence comes around to that slot, the instruction fetch for the respective thread is passed over. Alternatively it is not excluded for example that in alternative, less preferred implementations, some slots can be temporarily vacant and excluded from the scheduled sequence. Where reference is made to the number of time slots the execution unit is operable to interleave, or such like, this refers to the maximum number of slots the execution is capable of executing concurrently, i.e. the number unit's hardware supports.

The fetch stage 14 has access to the program counter (PC) of each of the contexts. For each respective thread, the fetch stage 14 fetches the next instruction of that thread from the next address in the program memory 12 as indicated by the program counter. The program counter increments each execution cycle unless branched by a branch instruction. The fetch stage 14 then passes the fetched instruction to the decode stage 16 to be decoded, and the decode stage 16 then passes an indication of the decoded instruction to the execution unit 18 along with the decoded addresses of any operand registers 32 specified in the instruction, in order for the instruction to be executed. The execution unit 18 has access to the operand registers 32 and the control registers 28, which it may use in executing the instruction based on the decoded register addresses, such as in the case of an arithmetic instruction (e.g. by adding, multiplying, subtracting or dividing the values in two operand registers and outputting the result to another operand register of the respective thread). Or if the instruction defines a memory access (load or store), the load/store logic of the execution unit 18 loads a value from the data memory into an operand register of the respective thread, or stores a value from an operand register of the respective thread into the data memory 22, in accordance with the instruction. Or if the instruction defines a branch or a status change, the execution unit changes value in the program counter PC or one of the status registers SR accordingly. Note that while one thread's instruction is being executed by the execution unit 18, an instruction from the thread in the next time slot in the interleaved sequence can be being decoded by the decode stage 16; and/or while one instruction is being decoded by the decode stage 16, the instruction from the thread in the next time slot after that can be being fetched by the fetch stage 14 (though in general the scope of the disclosure is not limited to one instruction per time slot, e.g. in alternative scenarios a batch of two or more instructions could be issued from a given thread per time slot). Thus the interleaving advantageously hides latency in the pipeline 13, in accordance with known barrel threaded processing techniques.

Figure 3:
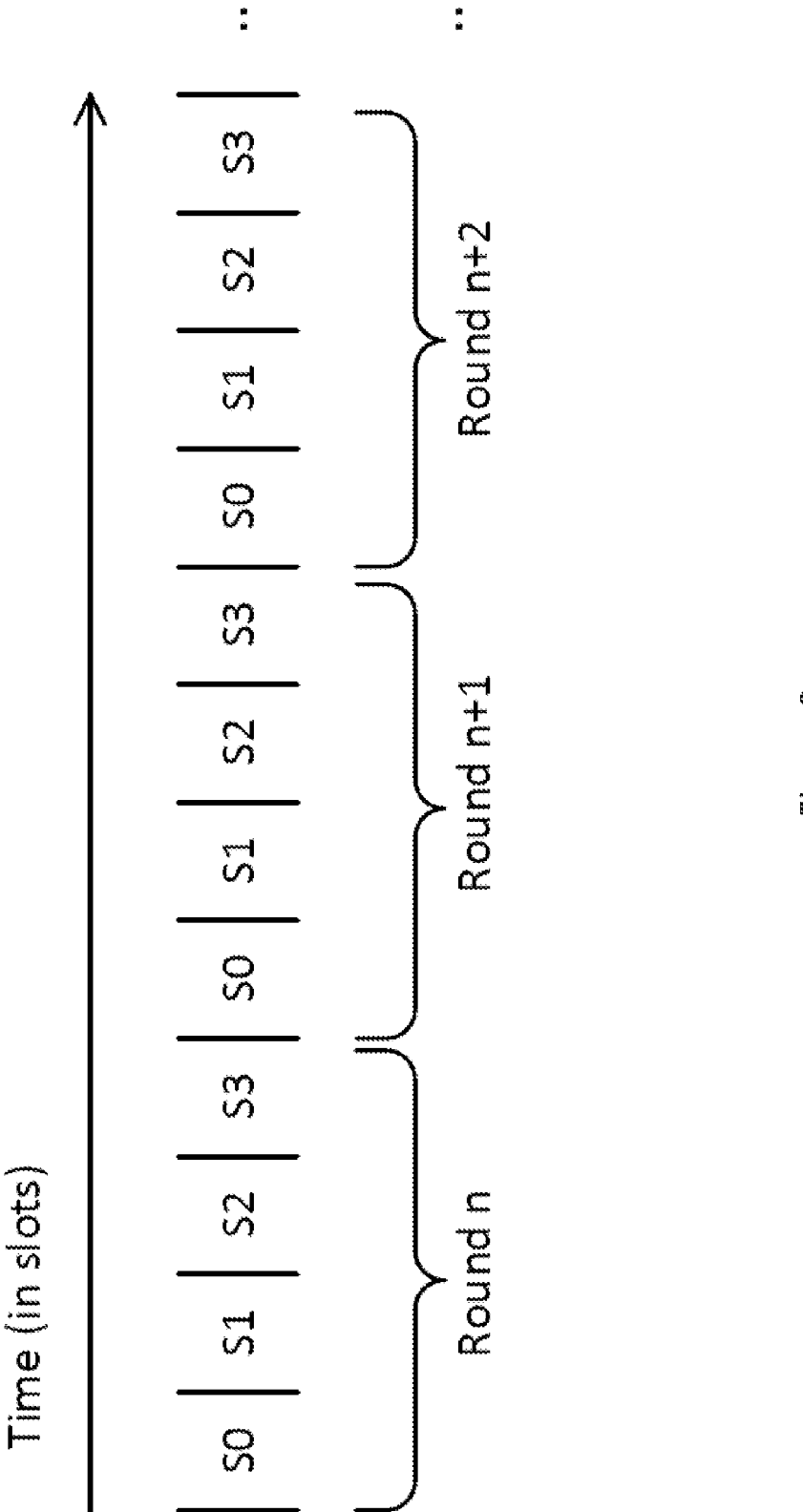
FIG. 3 schematically illustrates a scheme of interleaved time slots.

An example of the interleaving scheme implemented by the scheduler 24 is illustrated in FIG. 3. Here the concurrent threads are interleaved according to a round-robin scheme whereby, within each round of the scheme, the round is divided into a sequence of time slots S0, S1, S2 . . . , each for executing a respective thread. Typically, each slot is one processor cycle long and the different slots are evenly sized, though not necessarily so in all possible embodiments, e.g. a weighted round-robin scheme is also possible whereby some threads get more cycles than others per execution round. In general the barrel-threading may employ either an even round-robin or a weighted round-robin schedule, where in the latter case the weighting may be fixed or adaptive.

Whatever the sequence per execution round, this pattern then repeats, each round comprising a respective instance of each of the time slots. Note therefore that a time slot as referred to herein means the repeating allocated place in the sequence, not a particular instance of the time slot in a given repetition of the sequence. Put another way, the scheduler 24 apportions the execution cycles of the pipeline 13 into a plurality of temporally interleaved (time-division multiplexed) execution channels, with each comprising a recurrence of a respective time slot in a repeating sequence of time slots. In the illustrated embodiment, there are four time slots, but this is just for illustrative purposes and other numbers are possible. E.g. in one preferred embodiment there are in fact six time slots.

Whatever the number of time slots the round-robin scheme is divided into, then according to present disclosure, the processing unit 10 comprises one more context register file 26 than there are time slots, i.e. it supports one more context than the number of interleaved timeslots it is capable of barrel-threading.

This is illustrated by way of example in FIG. 2: if there are four time slots S0 . . . S3 as shown in FIG. 3, then there are five context register files, labelled here CX0, CX1, CX2, CX3 and CXS. That is, even though there are only four execution time slots S0 . . . S3 in the barrel-threaded scheme and so only four threads can be executed concurrently, it is disclosed herein to add a fifth context register file CXS, comprising a fifth program counter (PC), a fifth set of operand registers 32, and in embodiments also a fifth set of one or more status registers (SR). Though note that as mentioned, in embodiments the supervisor context may differ from the others CX0 . . . 3, and the supervisor thread may support a different set of instructions for operating the execution pipeline 13.

Each of the first four contexts CX0 . . . CX3 is used to represent the state of a respective one of a plurality of "worker threads" currently assigned to one of the four execution time slots S0 . . . S3, for performing whatever application-specific computation tasks are desired by the programmer (note again this may only be subset of the total number of worker threads of the program as stored in the instruction memory 12). The fifth context CXS however, is reserved for a special function, to represent the state of a "supervisor thread" (SV) whose role it is to coordinate the execution of the worker threads, at least in the sense of assigning which of the worker threads W is to be executed in which of the time slots S0, S1, S2 . . . at what point in the overall program. Optionally the supervisor thread may have other "overseer" or coordinating responsibilities. For example, the supervisor thread may be responsible for performing barrier synchronisations to ensure a certain order of execution. E.g. in a case where one or more second threads are dependent on data to be output by one or more first threads run on the same processor module 4, the supervisor may perform a barrier synchronization to ensure that none of the second threads begins until the first threads have finished. And/or, the supervisor may perform a barrier synchronization to ensure that one or more threads on the processor module 4 do not begin until a certain external source of data, such as another tile or processor chip, has completed the processing required to make that data available. The supervisor thread may also be used to perform other functionality relating to the multiple worker threads. For example, the supervisor thread may be responsible for communicating data externally to the processing device 4 (to receive external data to be acted on by one or more of the threads, and/or to transmit data output by one or more of the worker threads). In general the supervisor thread may be used to provide any kind of overseeing or coordinating function desired by the programmer. For instance as another example, the supervisor may oversee transfer between the tile local memory 12 and one or more resources in the wider system (external to the array 6) such as a storage disk or network card.

Note of course that four time slots is just an example, and generally in other embodiments there may be other numbers, such that if there are a maximum of M time slots 0 . . . M−1 per round, the processing device 4 comprises M+1 contexts CX . . . CX(M−1) & CXS, i.e. one for each worker thread that can be interleaved at any given time and an extra context for the supervisor. E.g. in one exemplary implementation there are six timeslots and seven contexts.

Figure 4:
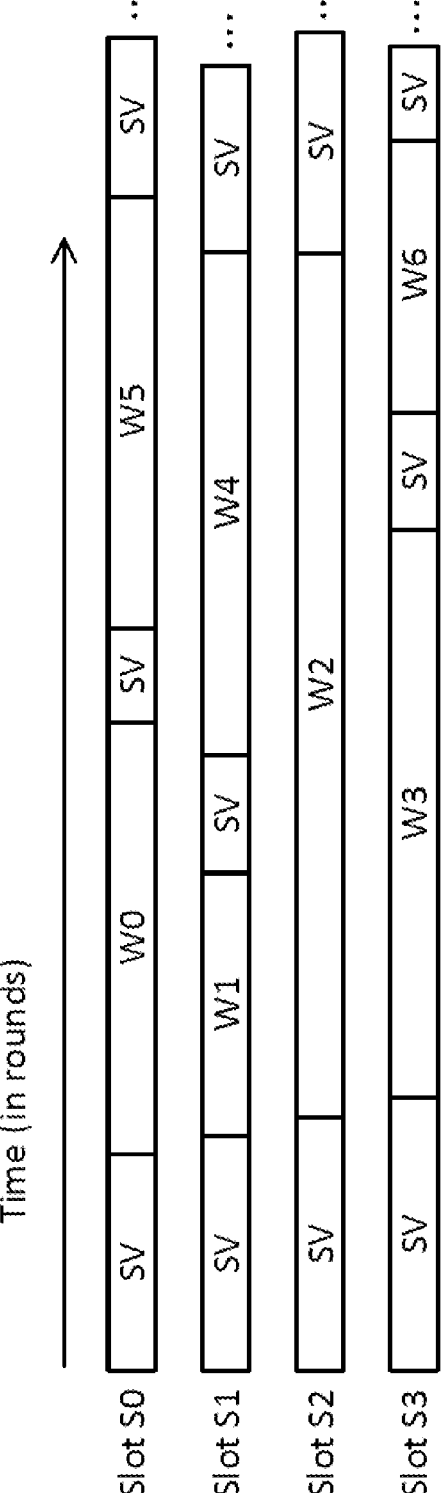
FIG. 4 schematically illustrates a supervisor thread and plurality of worker threads running in a plurality of interleaved time slots.

Referring to FIG. 4, in accordance with the teachings herein, the supervisor thread SV does not have its own time slot per se in the scheme of interleaved execution time slots. Nor do the workers as allocation of slots to worker threads is flexibly defined. Rather, each time slot has its own dedicated context register file (CX0 . . . CXM−1) for storing worker context, which is used by the worker when the slot is allocated to the worker, but not used when the slot is allocated to the supervisor. When a given slot is allocated to the supervisor, that slot instead uses the context register file CVS of the supervisor. Note that the supervisor always has access to its own context and no workers are able to occupy the supervisor context register file CXS.

The supervisor thread SV has the ability to run in any and all of the time slots S0 . . . S3 (or more generally S0 . . . SM−1). The scheduler 24 is configured so as, when the program as a whole starts, to begin by allocating the supervisor thread to all of the time slots, i.e. so the supervisor SV starts out running in all of S0 . . . S3. However, the supervisor thread is provided with a mechanism for, at some subsequent point (either straight away or after performing one or more supervisor tasks), temporarily relinquishing each of the slots in which it is running to a respective one of the worker threads, e.g. initially workers W0 . . . W3 in the example shown in FIG. 4. This is achieved by the supervisor thread executing a relinquish instruction, called "RUN" by way of example herein. In embodiments this instruction takes two operands: an address of a worker thread in the instruction memory 12 and an address of some data for that worker thread in the data memory 22:

RUN task_addr, data_addr

The worker threads are portions of code that can be run concurrently with one another, each representing one or more respective computation tasks to be performed. The data address may specify some data to be acted upon by the worker thread. Alternatively, the relinquish instruction may take only a single operand specifying the address of the worker thread, and the data address could be included in the code of the worker thread; or in another example the single operand could point to a data structure specifying the addresses of the worker thread and data. As mentioned, in embodiments at least some of the workers may take the form of codelets, i.e. atomic units of concurrently executable code. Alternatively or additionally, some of the workers need not be codelets and may instead be able to communicate with one another.

The relinquish instruction ("RUN") acts on the scheduler 24 so as to relinquish the current time slot, in which this instruction is itself executed, to the worker thread specified by the operand. Note that it is implicit in the relinquish instruction that it is the time slot in which this instruction is executed that is being relinquished (implicit in the context of machine code instructions means it doesn't need an operand to specify this—it is understood implicitly from the opcode itself). Thus the time slot which is given away is the time slot in which the supervisor executes the relinquish instruction. Or put another way, the supervisor is executing in the same space that that it gives away. The supervisor says "run this piece of code at this location", and then from that point onwards the recurring slot is owned (temporarily) by the relevant worker thread.

The supervisor thread SV performs a similar operation in each of one or more others of the time slots, to give away some or all of its time slots to different respective ones of the worker threads W0 . . . W3 (selected from a larger set W0 . . . wj in the instruction memory 12). Once it has done so for the last slot, the supervisor is suspended (then later will resume where it left off when one of the slots is handed back by a worker W).

The supervisor thread SV is thus able to allocate different worker threads, each performing one or more tasks, to different ones of the interleaved execution time slots S0 . . . S3. When the supervisor thread determines it is time to run a worker thread, it uses the relinquish instruction ("RUN") to allocates this worker to the time slot in which the RUN instruction was executed.

The "RUN" instruction discussed above is useful for initiating individual worker threads in cases where those worker threads are running separate codelets. In this case, each worker thread will perform a different set of operations on a set of data having a location in memory that is specified by the RUN instruction.

In embodiments of the application, it is arranged that in some cases each worker thread executes the same codelet in order to perform a same set of operations on a different set of data located together in an input buffer in the memory. The result of this processing by each worker is that each worker generates a different set of results, with each of these sets being stored together in an output buffer in the memory. In this case, the workers may be said to operate in a data parallel manner. In circumstances in which the workers are operating in a data parallel manner, it is realised that gains in computational efficiency may be achieved by provision in the relevant execution unit of a hardware module that is a responsive to a single instruction (termed here the "RUNALL" instruction) to determine the location/s in the input buffer of the data for each of the worker threads. In response to the execution of the RUNALL instruction, the execution unit causes the operand registers of the worker threads to be populated with the one or more variables identifying the location of the data for the respective worker, and also causes each of the workers to be launched in one of the slots S0 . . . S3 (or more generally S0 . . . S(M−1)). The same one or more variables identifying the locations of the data for the respective worker are also used to enable each of the workers to determine the location/s in the output buffer of the data for each of the worker threads.

The instruction that causes the one or more variables to be determined by the dedicated hardware is referred to herein as the RUNALL instruction, but may also be termed as a "first instruction".

Figure 5:
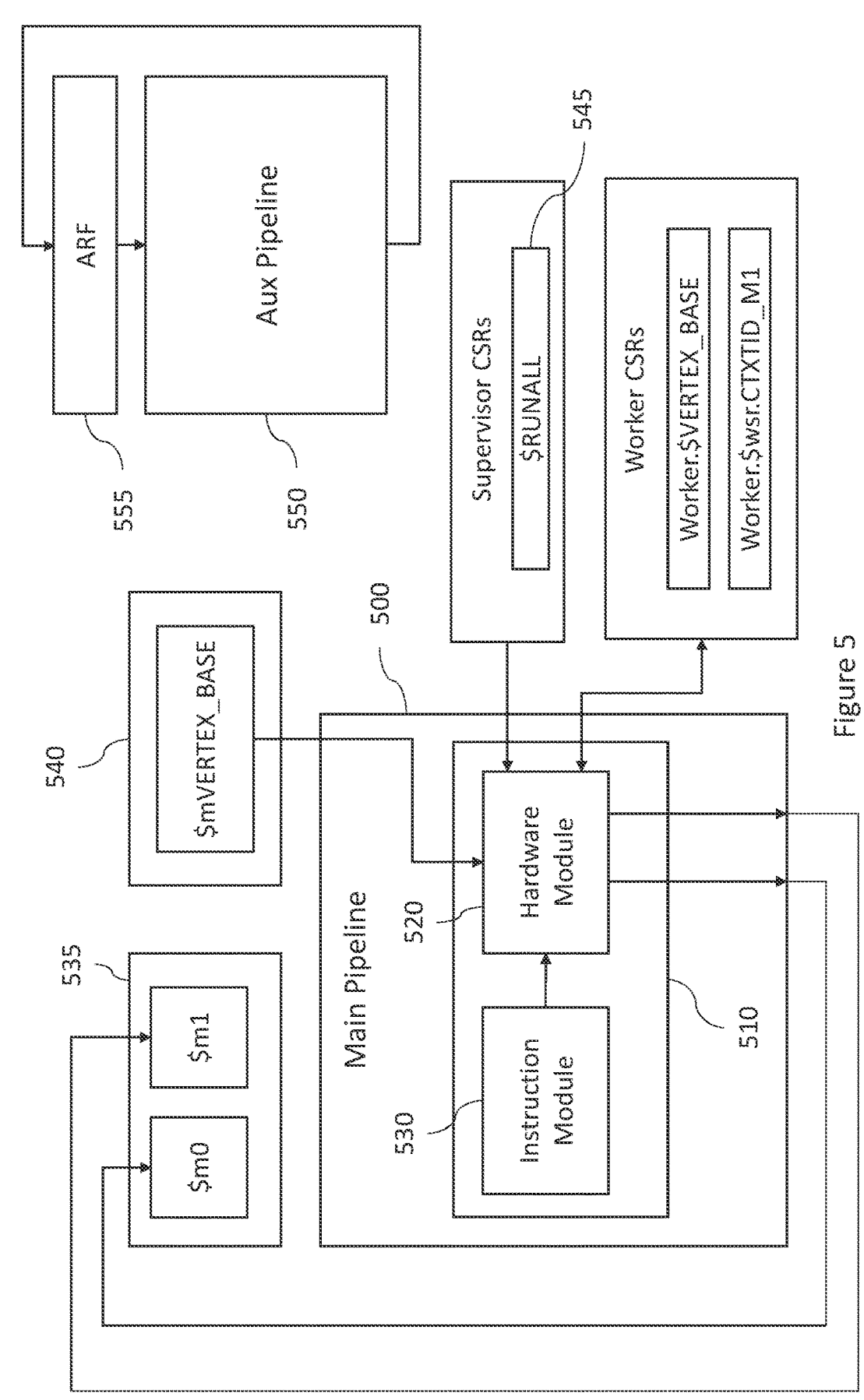
FIG. 5 is an illustration of an execution pipeline comprising a hardware module for populating registers of worker threads with variables enabling identification of data to be processes by those worker threads.

Reference is made to FIG. 5, which illustrates the elements of the processing device 4 used during the execution of the RUNALL instruction. Included within the processing device 4 is a main pipeline 500 for the execution of certain instructions by the processing device. The main pipeline 500 is responsible for the execution of memory instructions, e.g. load and store instructions, and is also responsible for execution of the RUNALL instruction. The main pipeline 500 comprises an execution unit 510, which takes the form and operates in the manner as the execution unit 18, described above with respect to FIG. 1.

The execution unit 510 comprises a block of processing logic, referred to herein as a hardware module 520, for execution unit 510. The execution unit 510 also comprises an instruction module 530, which comprises control circuitry configured to, in response to the RUNALL instruction, cause the hardware module 520 to determine the variables (the location variables) enabling identification by each worker thread of the locations of input data and the locations for storing results. The hardware module 520, having determined these variables, causes them to be stored in the operand registers 32 of the worker threads. Each of the workers is assigned certain data in the input buffer on which it is operate. Each of the workers performs the same set of operations repeatedly in a loop. A given quantity of data on which a single iteration of the loop will operate is referred to herein as an 'input atom'. An input atom may comprise a plurality of items of data that are loaded from different locations in the input atom as a result of different load instructions and operated on separately by different arithmetic operations. Each iteration of the loop also produces a certain quantity of data to be stored in a unit of memory, and which is referred to herein as an 'output atom'. An output atom may comprise a plurality of items of data that are produced as a result of multiple arithmetic operations and stored to different locations in the atom in response to multiple store instructions. Since each iteration of the loop consumes one atom of input data and outputs one atom of output data, the number of atoms in the input buffer and the number of atoms in the output buffer will be the same. However, the input atom size need not be the same as the output atom size.

The following discussion refers to determining the locations in memory 22 to be accessed by the worker thread when executing the codelet. Accessing an input atom in memory refers to loading data of that atom for use in operations. Accessing an output atom in memory refers to storing results of that atom to the output buffer. Unless otherwise specified, teaching in relation to a 'buffer' applies to both the input buffer and the output buffer.

The location variables determined by the hardware module 520 for each worker thread include an offset into an input buffer in memory 22. The offset into the input buffer in memory 22 specifies the location (from a base address of the input buffer) of the start of the first atom of data in the input buffer to be accessed by the worker thread when executing the codelet.

The hardware module 520 directly determines the offset into the input buffer. Each of the worker threads, when executing its codelet, determines based on the offset into the input buffer, the offset into the output buffer in memory 22. The offset into the output buffer specifies the location (from a base address of the output buffer) of the start of the first atom of data in the output buffer to be accessed by the worker thread when storing results to the output buffer. The difference between the offset into the input buffer (input offset) and the offset into the output buffer (the output offset) will depend upon the operations performed as part of the codelet. Therefore, the worker threads, when executing the codelet will determine the output offset from the input offset.

The location variables also include an iteration count value for a given thread, which specifies the number of atoms of data to be accessed by the respective thread in the memory 22 starting from the first atom of data at the location specified by the offset value. The iteration count is the same for accessing the input buffer and the output buffer.

After accessing each atom of data, the worker thread increments its address pointer, which identifies an address located in the buffer that is to be accessed. The next atom of data to be accessed is then accessed in memory 22 at the location identified by the incremented address pointer. By providing the offset and the number of atoms of data to be operated on in the form of the iteration count value—the variables for a particular worker thread provide their associated worker thread with sufficient information to identify each input atom of the set of data for processing by that worker thread and the locations to which each of the output atoms generated by that worker thread are to be stored.

FIG. 5 illustrates two of the operand registers 32, shown as $m0 and $m1, for a particular worker thread. These registers belong to a memory register file (MRF) 535. Although FIG. 5 only shows one example MRF 535 comprising one $m0 register and one $m1 register, the processing device 4 comprises an MRF 535 for each worker thread. The first register ($m0) stores the input offset value for the respective worker thread, whilst the second register ($m1) stores the iteration count for the respective worker thread. These values will be used by the worker thread (once the worker thread is launched) to determine the locations of input atoms in the memory 22 and the locations in memory 22 to which the output atoms of results data will be stored.

In order to derive the offset and iteration count values for a worker, the hardware module 520 operates on a worker ID value, which enables the determination of the portion of the buffer that is assigned for the respective worker. The set of operations performed by the hardware module 520 on the worker ID depend upon the layout of the data in the buffer. Two example layouts are present here, a first layout being an interleaved layout in which data for different workers is interleaved in the buffer, and a second layout being a non-interleaved layout in which the data for each worker is stored in a contiguous portion of the buffer containing data that is only for that worker.

For the case of the interleaved layout, the hardware module 520 determines the input offset for a particular worker as follows:

$$\text{input offset} = \text{worker ID} * \text{input atomsize} \qquad \text{Equation 1}$$

The atomsize (in equation 1 and the subsequent equations) is the amount of memory space in the buffer used for storing data relating to a single iteration of a loop. For an input buffer, this amount of memory (the input atomsize) is the amount used for storing the data that is consumed within a single iteration of the loop when executing the codelet.

The input offsets determined by the hardware module 520 are stored in the $m0 registers. Each of the worker threads may use the input offset value in its $m0 register to determine the output offset. Each of the worker threads determines its output offset from its input offset by applying a scaling factor, which is dependent upon the ratio between the amount of input data and the amount of output data. The output offset is given by:

$$\text{output offset} = \text{input offset} * \text{scaling factor} \qquad \text{Equation 2}$$

The scaling factor is determined during compilation of the codelet and is provided as part of the codelet. The scaling factor is available to the worker thread for use as an intermediate operand of the RUNALL instruction for determining the output offset from the input offset.

In many cases, the scaling factor will be a power of 2, e.g. 0.25, 0.5, 1, 2, 4, etc. Therefore, each worker thread is operable to determine the output offset by applying a left shift or right shift to the input offset.

Additionally, in the case of the interleaved layer, the hardware module 520 determines the iteration count as:

$$\text{iteration count} = \text{floor}\left(\frac{\text{buffer size}}{\text{no of workers}}\right) + \text{worker } id \qquad \text{Equation 3}$$
$$< \text{buffer size \% no of workers}$$

Equation 3 provides the iteration count for both the output buffer and the input buffer.

Figure 6:
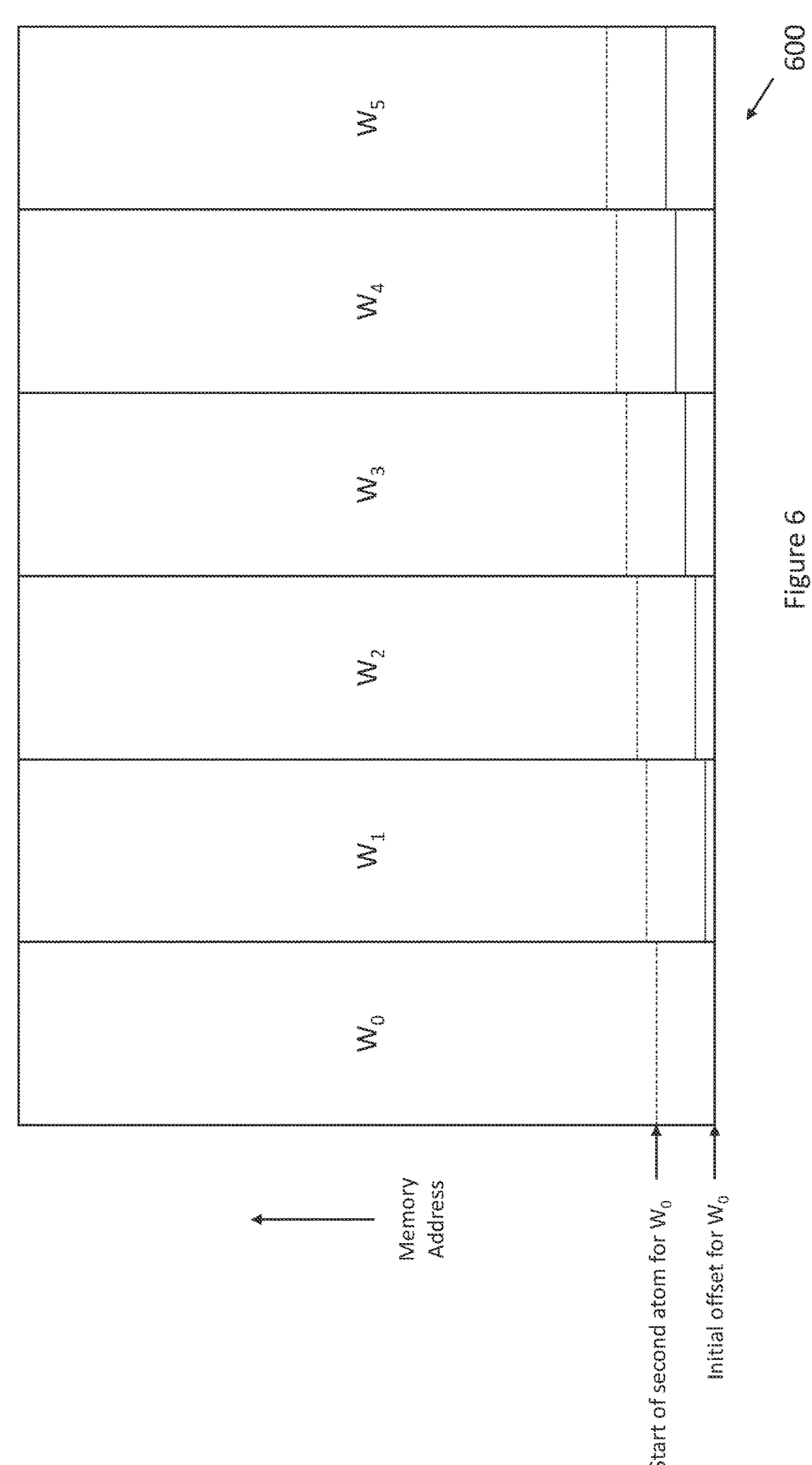
FIG. 6 is an illustration of the division of an input buffer in memory between worker threads, in the case that an interleaved layout is applied to the data.

Reference is made to FIG. 6, which illustrates how the memory space within a buffer 600 (which may be an input buffer or an output buffer) may be divided up between different worker threads in the case that the data (i.e. either input data or results) is stored in the buffer 600 in an interleaved layout. The memory address of the buffer increases vertically along the page. The buffer 600 is shown divided into multiple columns, each of which is associated with a different one of the workers. A solid line is shown in each column, which represents the offset into the buffer 600 for the respective worker, where that offset is determined using equation 1 and, for the output offset, also using equation 2. This offset for a worker is the location in the buffer 600 of the first atom of data in buffer 600 to be accessed by the worker. A series of dotted lines are also shown in each column. These represent the starting locations in memory 22 of each of the second atoms that are accessed by their respective worker threads.

The first worker thread $W_0$ has a worker ID of zero and so (in accordance with equation 1) is assigned an offset of zero. As represented by the location of the solid line in the column for $W_0$, $W_0$ accesses the first atom of data in the buffer 600. The second worker thread has a worker ID of one and so is assigned an offset of one atom. As represented by the location of the solid line in the column for $W_1$, $W_1$ accesses the second atom in the buffer 600. Since there six worker threads, each of the first six atoms of data in the buffer 600 are assigned to a different one of the worker threads.

When the buffer 600 is an input buffer from which the loading items of data is performed, each respective worker thread uses a read pointer value maintained in its MRF 535. When loading its first item of data, the read pointer value for a given worker thread is set to given by the combination of the base address of the input buffer and the input offset value determined for the respective thread in accordance with equation 1. After completing the load operation, the read pointer value is then incremented by a stride value to point to the next item of data in the same atom. The load operation is then performed to load this next item of data, before the read pointer value is then incremented by the stride value. Each of these items of data are loaded and operated on, with the read pointer value being incremented until the worker reaches the end of the atom. At the end of the atom, the read pointer is increment by a further stride value so as to point to the next atom to be accessed by that worker. This further stride value is larger than the stride value used to increment the read pointer between each of the items of data within an atom. For the interleaved pattern, the further stride value is (see equation 4 below) given by the input atomsize multiplied by the number of worker threads minus one, e.g. five in the example shown in FIG. 6. The loading of further items of data is performed starting from the beginning of the next atom of data then identified by the updated read pointer value.

When the buffer 600 is an output buffer to which results determined by the worker threads are stored, each respective worker thread uses a write pointer value maintained in its MRF 535. The initial write pointer value for a given thread is given by the combination of the base address for the output buffer and the output offset value determined for the respective thread in accordance with equations 1 and 2. Each worker thread stores its first item of results data at the location specified by its initial write pointer value. After completing the store operation, the write pointer value is then incremented by a stride value to point to the next location (which is contiguous with the location of the first item of results data) in the same atom. A store operation is then performed to store the next item of results data, before the write pointer value is again incremented by the stride value. Each of the items of results data are stored, with the write pointer value being incremented between each store until the worker has stored all of the results data for that iteration of the loop. At the end of storing the results, the write pointer is increment by a further stride value so as to point to the next atom to be accessed by that worker. This further stride value is larger than the stride value used to increment the write pointer between each of the items of data within each atom. For the interleaved pattern, the further stride value is (see equation 4 below) the output atomsize multiplied by the number of worker threads minus one, e.g. five in the example shown in FIG. 6. The storing of the results data for the next iteration is then performed starting from the beginning of the next atom of data then identified by the updated write pointer value.

As shown in FIG. 6, the start of the second atom accessed by thread $W_0$ is displaced from the start of the first atom accessed by thread $W_0$ by the atomsize (either the input or output atomsize) multiplied by the number of worker threads (i.e. six in this example). However, the start of the second atom accessed by thread $W_0$ is displaced from the end of the first atom (which is reached by applying the smaller stride value between each item of data) accessed by thread $W_0$ by the atomsize multiplied by the number of worker threads minus one (i.e. five in this example). Therefore, each worker thread, after accessing an atom of data in buffer 600, increments its pointer value (i.e. the write pointer or read pointer) by an amount given by:

$$\text{Interleaved stride} = \text{atomsize} * (\text{number of worker threads} - 1) \qquad \text{Equation 4}$$

The interleaved stride determined in accordance with equation 4 is applied from the end of the first atom to determine the start of the second atom accessed by a particular worker thread. The start of the second atom is displaced from the start of the first atom by a number of atoms that is equal to the number of worker threads.

The accessing of atoms of data continues until the end of the buffer 600 is reached. The iteration count for each worker thread determined from equation 3 allows each worker to determine when it has accessed its final atom of data. Since the buffer 600 may not comprise a number of atoms that is a multiple of the number of workers, one or more of the workers may have an iteration count that is one greater than the iteration count for one or more others of the workers. In accordance with equation 3, the iteration count for each of the workers is determined by dividing the buffer size (expressed in atoms) by the number of workers. If this division does not result in an integer (in which case each worker will not have the same iteration count), the result is rounded down to the nearest integer value. To the result of rounding, an additional value of one is added if the worker ID of the respective worker is less than the remainder of the division of the buffer size by the number of workers.

Figure 7:
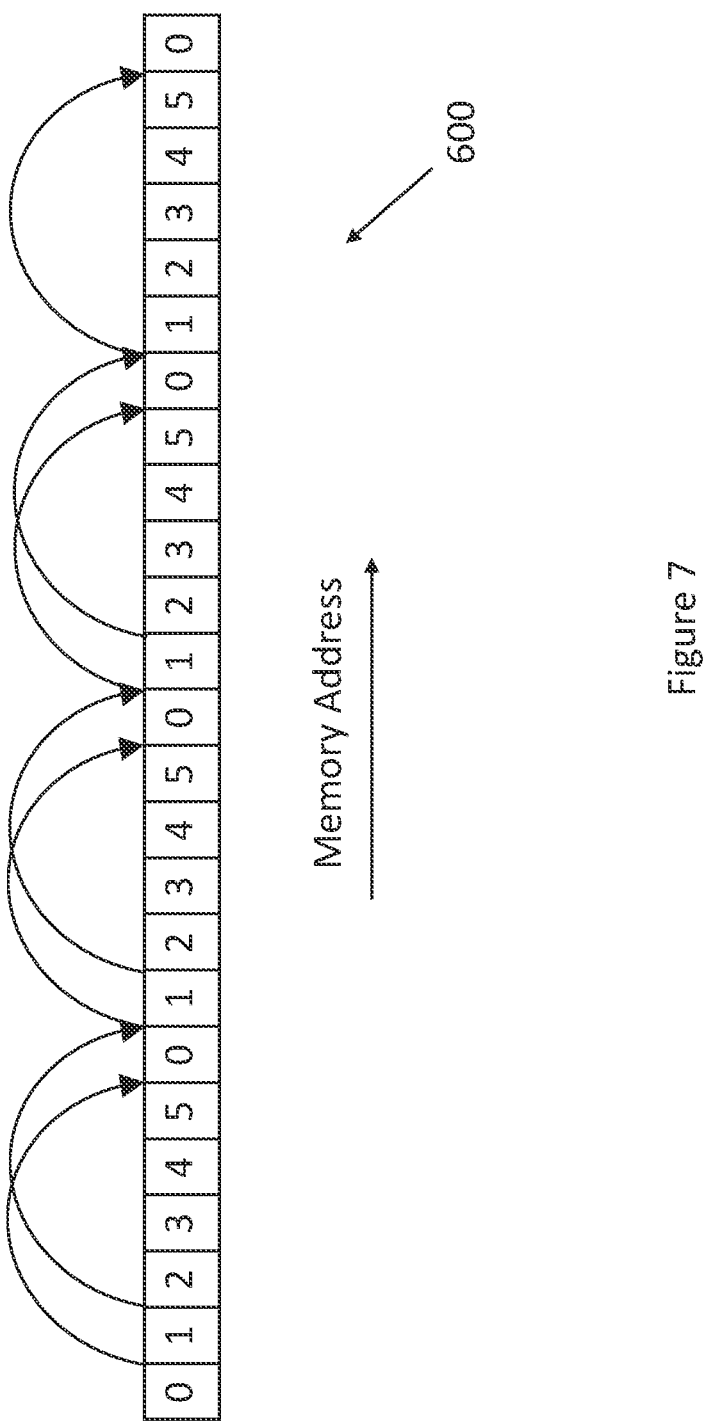
FIG. 7 is an illustration of how each of two worker threads increments its read/write pointer when accessing data in a buffer having an interleaved layout of data.

Reference is made to FIG. 7, which illustrates an example of how atoms (i.e. input atoms or output atoms) for different workers may be arranged in the buffer 600 and how the workers adjust their pointers (i.e. read pointers or write pointers) in accordance with a stride value between accesses to each atom of data. Each of the numbered elements in FIG. 7 represents an atom. The atoms are shown with the address increasing horizontally across the page. It would be appreciated that, in practice, a buffer 600 would likely include a larger number of atoms than the number illustrated in FIG. 7. The number shown in each element represents the ID of the worker that accesses the atom of data.

Arrows are shown illustrating the stride behaviour of the first worker ($W_0$) and the second worker ($W_1$), although the other workers also exhibit similar stride behaviour. The stride behaviour between locations within each atom is not illustrated. However, accessing each atom would in most cases involving loading (for input atoms) or storing (for output atoms) a plurality of items of data. After accessing an atom of data in memory, each worker increments its pointer by a stride value determined from equation 4 (i.e. five atoms in this example) and accesses the atom of data that is then pointed to by the updated pointer. In the example of FIG. 7, the number of atoms for the buffer 600 is such that the number of atoms in the buffer 600 is not a multiple of the number of workers, and is one greater (since worker $W_0$ has one more atom with which it is associated) than a multiple of the number of workers. As a result, the iteration count for worker $W_0$ is one greater than the iteration count for the remaining workers, and so worker $W_0$ will perform one more iteration of the loop in the codelet.

For the case of the separated layout, the hardware module 520 determines the input offset for a particular worker as follows:

$$\text{input offset} = \text{worker } ID * \text{input atomsize} \qquad \text{Equation 5}$$
$$* \text{ceil}\left(\frac{\text{buffer size}}{\text{number of workers}}\right)$$

As for the interleaved case discussed above, the output offset is determined by the worker threads applying a scaling factor to the input offset. The output offset is, therefore, determined by applying equation 2, where the input offset is given by equation 5.

As in the interleaved case, the iteration count for accessing the input buffer is the same as the iteration count for accessing the output buffer. In order to determine the iteration counts for each worker, the hardware module 520 determines a value (referred to herein as "max_count") representing the largest iteration count for any of the workers. max_count is given by:

$$\text{max\_count} = \text{ceil}\left(\frac{\text{buffer size}}{\text{number of workers}}\right) \qquad \text{Equation 6}$$

Here the buffer size is given in terms of the number of atoms in the buffer. If the number of atoms in the buffer is less than or equal to the number of workers, the value of max_count is one. Otherwise, the value of max_count is greater than or equal to two, since at least one worker will have two or more atoms to access in the buffer.

Additionally, in order to determine the iteration count for each worker, the hardware module 520 determines a worker ID value for which workers with an ID value less that this determined value will have an iteration count given by the max_count value, whereas workers with an ID value greater than or equal to the determined value will have a lower iteration count. This determined worker ID value is referred to herein as "cutoff" and is given by:

$$\text{cutoff} = \text{floor}\left(\frac{\text{buffer size}}{\text{max\_count}}\right) \qquad \text{Equation 7}$$

Here the buffer size is given in terms of the number of atoms in the buffer. If a worker ID is less than this cutoff value, the worker is assigned an iteration count that is equal to the max_count value. If the worker ID is equal to this cutoff value, the iteration count is set equal to a different value (referred to herein as "remainder"), which is given by the remainder of the division performed in equation 7, that is:

$$\text{remainder} = \text{buffer size } \% \text{ max\_count} \qquad \text{Equation 8}$$

If the worker ID is greater than the cutoff value, then the iteration count is set equal to zero.

Therefore, to determine the iteration counts for the worker threads, the hardware module 520 determines the cutoff value in accordance with equation 7. For each worker thread, the hardware module 520 then performs a comparison between the cutoff value and the worker ID value for the respective worker thread. If the worker ID value is less than the cutoff value, the hardware module 520 sets the iteration count to be equal to max_count. If the worker ID is equal to the cutoff value, the hardware module 520 sets the iteration count for that worker to be equal to the remainder determined using equation 8. If the worker ID value is greater than the cutoff value, the hardware module 520 sets the iteration count for that worker to be equal to zero.

Figure 8A:
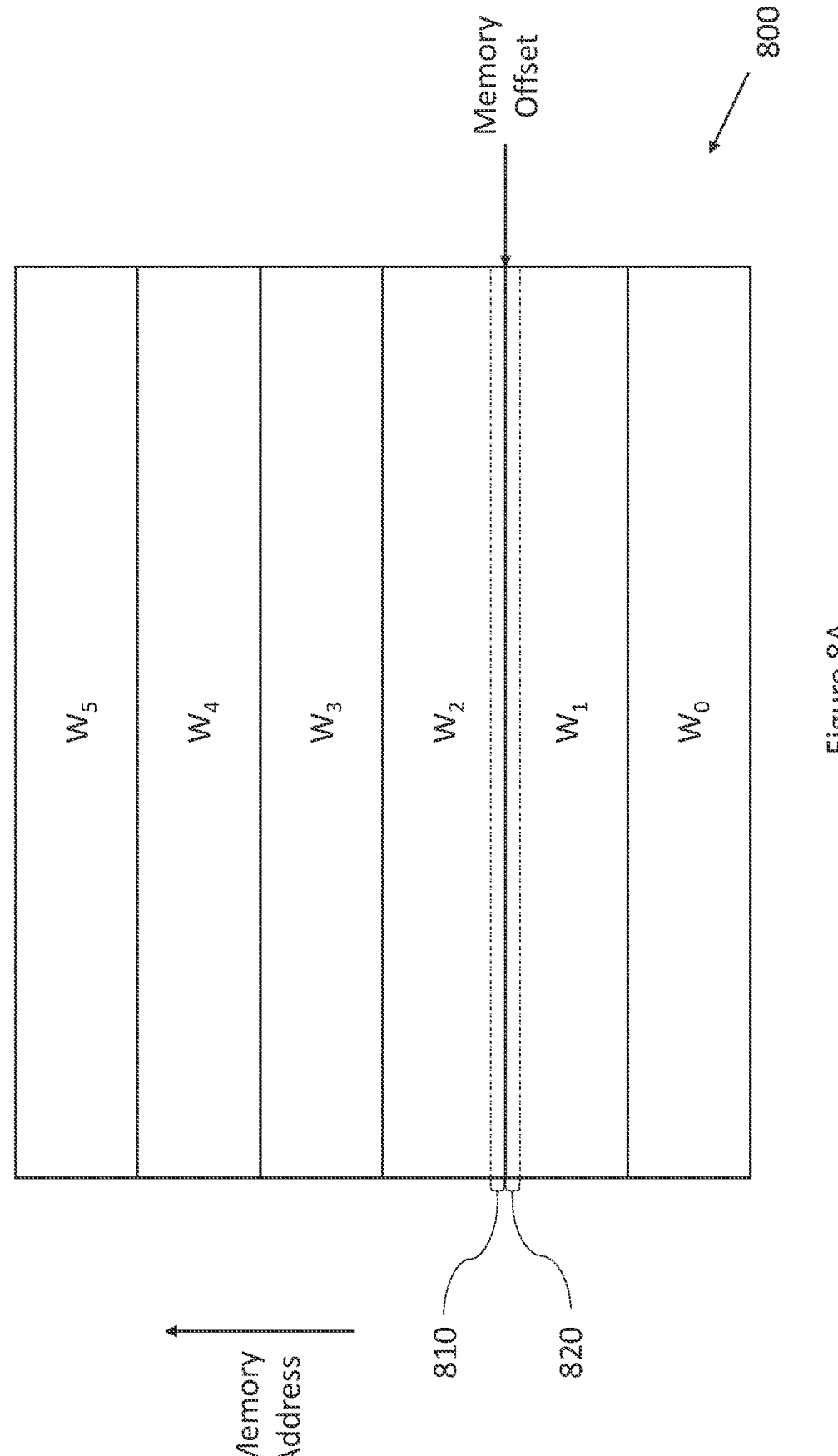
FIG. 8A is an illustration of the division of an input buffer in memory between worker threads, in the case that a separated layout is applied to the input buffer and the buffer size is a multiple of the number of threads.

Reference is made to FIG. 8A, which illustrates how the memory space of a buffer 800 (which may be an input buffer or an output buffer) may be shared between different worker threads in the case that each worker is assigned a contiguous region of memory. The buffer 800 shown in FIG. 8A represents an example in which the buffer 800 is divided equally between the worker threads, such that each worker thread is assigned an equally sized region of memory for storage of its associated data (i.e. input data or results data).

The input offset for each worker thread is determined by the hardware module 520 applying equation 5. The output offset is additionally determined by each worker thread applying equation 2 to the input offset determined using equation 5. The result is that the offset value, which specifies the location of the first atom for a worker thread is located either at the start of the buffer (for worker $W_0$) or following the memory region assigned to another of the workers. As an example, FIG. 8A indicates the offset value for worker W2. This offset value provides an indication of the location of the first atom 810 in the buffer 800 that is accessed by worker thread W2 when executing the codelet. This atom is located adjacent to the last atom 820 in the buffer 800 that is accessed by the worker thread $W_1$ when executing the codelet.

Throughout its execution of the codelet, each of the workers accesses each of the atoms within its allocated memory space in buffer 800. For the input buffer, when accessing each input atom, a worker loads each of the items of data belonging to one of its atoms, applying a stride to its read pointer between each load. When it has loaded the last item of data belonging to one of its input atoms, since its atoms are contiguous to one another, the same stride may be applied to the read pointer in order to point to the item of data at the start of the next atom. Each worker will continue to apply the stride to the read pointer until it has loaded the last item of the last atom in its allocated region of memory.

For the output buffer, when accessing each output atom, a worker stores multiple items of data to that output atom, applying a stride to its write pointer between each store. When it has stored the last item of data belonging to one of its output atoms, since its atoms are contiguous to one another, the same stride may be applied to the write pointer in order to point to the item of data at the start of the next atom. Each worker will continue to apply the stride to the write pointer until it has stored the last item of data to the last atom in its allocated region of memory.

Each worker continues to access atoms in the buffer 800 until its counter reaches its iteration count. Each worker's iteration count is determined by the hardware module 520 applying equations 6 to 8. In the example of FIG. 8A, the overall number of atoms in the buffer 800 is a multiple of the number of workers. In this case, the hardware module 520 determines the cutoff value to be equal to the number of workers. Since the worker IDs are allocated in the range of 0 to n−1, where n is the number of workers, each of the workers has a worker ID value that is below the cutoff value. Therefore, the hardware module 520 assigns to each of the worker threads, the same iteration count, which is given by the max_count value. As a result, the memory regions for the workers in FIG. 8A are equally sized.

Figure 8B:
FIG. 8B is an illustration of the division of an input buffer in memory between worker threads, in the case that a separated layout is applied to the input buffer and the buffer size is not a multiple of the number of threads.

Reference is made to FIG. 8B, which shows an alternative example of how a buffer 850 may be divided between worker threads. In this example, the number of atoms in the buffer 850 is not a multiple of the number of worker threads and, as a result, the iteration count for the last worker thread (i.e. the worker thread having the largest offset value, which is worker W5 in this example) is lower than the iteration count for the other worker threads. When determining the iteration counts, the hardware module 520 determines that the cutoff value is equal to n–1, where n is equal to the number of workers, and therefore is equal to the worker ID of the last worker. As a result, the hardware module 520 allocates each of the workers—apart from the last worker— an iteration count value equal to the max_count value determined from equation 6. Additionally, the hardware module 520 allocates the last worker, an iteration count value equal to the remainder value determined from equation 8.

Figure 9:
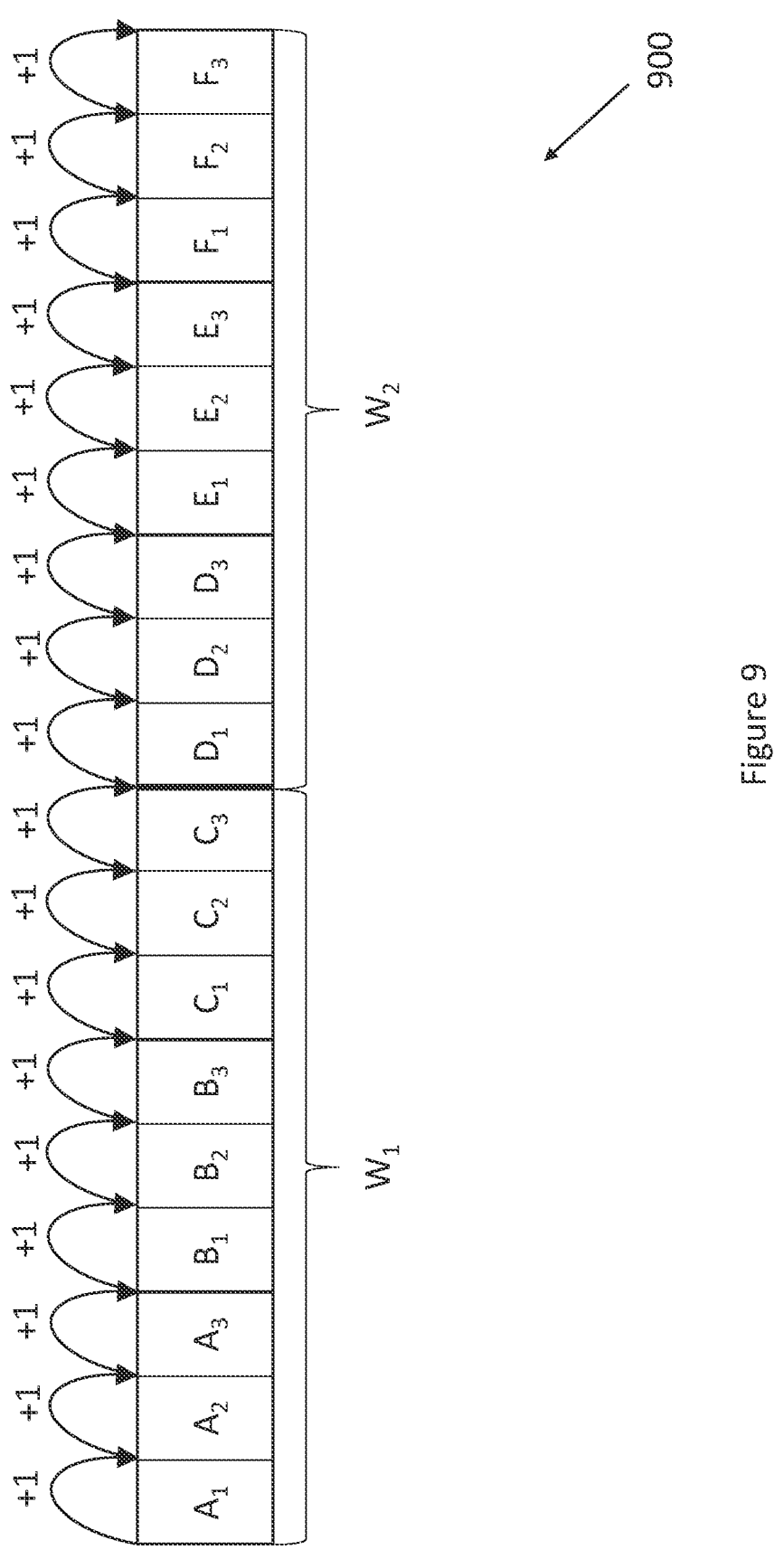
FIG. 9 is an illustration of how each of two worker threads increments its read/write pointer when accessing data in a buffer having a separated layout of data.

Reference is made to FIG. 9, which illustrates an example of how atoms of data may be accessed by two different worker threads in a portion 900 of either of the buffers 800, 850. The Figure shows the atoms of data are accessed by a first worker thread ($W_1$) and a second worker thread ($W_2$), but the same teaching may apply to any of the worker threads having assigned memory regions that are adjacent in buffers 800, 850. The items of data for worker $W_1$ are labelled with letters A, B, or C, whereas the items of data for worker $W_2$ are labelled with letters D, E, or F. The items of data may constitute input data that are loaded from the buffer 900 (in the case that the buffer 900 is an input buffer) for processing by their associated worker thread. The items of data may be results data that are stored in the buffer 900 (in the case that the buffer 900 is an output buffer) for processing by their associated worker thread. The items of data are shown grouped into atoms, where the items of data associated with a particular atom are each labelled with the same letter of letters A-F.

Each of the workers loads or stores one or more items of data within a given time slot of the barrel threaded processor before control is passed to the next worker. An example is here described where each worker only accesses a single item of data within each time slot. However, it would be appreciated that the number of items accessed in a single time slot may differ.

Firstly, worker $W_1$ executes an instruction to load or store the item of data $A_1$ at a memory location identified by its offset value provided by the hardware module 520. The worker $W_1$ then updates its pointer value to a new value by applying a stride to the pointer, where the stride value is given by the size of one item of data. Before the worker $W_1$ loads or stores the next item of data $A_{12}$, the worker $W_2$ executes an instruction to load or store its first item of data $B_1$ from a location in memory 22 identified by its offset value provided by the hardware module 520. The worker $W_1$ then updates its pointer value to a new value by applying a stride to the pointer, where the stride value is given by the size of one item of data. The worker $W_1$ will load or store its next item of data $A_2$ when its allocated time slot is selected in the barrel threaded processor. Likewise, the worker $W_2$ will load or store its next item of data $B_2$ when its allocated time slot is selected in the barrel threaded processor. In this way, the loading or storing of the items of data by the different workers is interleaved in time. Each of the workers $W_1$, $W_2$ continues loading or storing items of data, and performing a stride between each load/store, until the number of completed iterations of the loop of operations for that worker is equal to the iteration count for that worker.

Between the loading of different items of data, each worker thread may perform one or more arithmetic operations on the loaded items of data and one or more store operations to store results of those arithmetic operations to memory 22.

Referring back to FIG. 5, it is shown how the hardware module 520 receives different variables from registers of the processing device 4, and how the hardware module 520 outputs the variables (i.e. the input offset and iteration count) that are accessible to the worker threads and used by those worker threads to perform the load operations from the input buffer 700, 800, 850 and the store operations to the output buffer 700, 800, 850 in memory 22.

Figure 10:
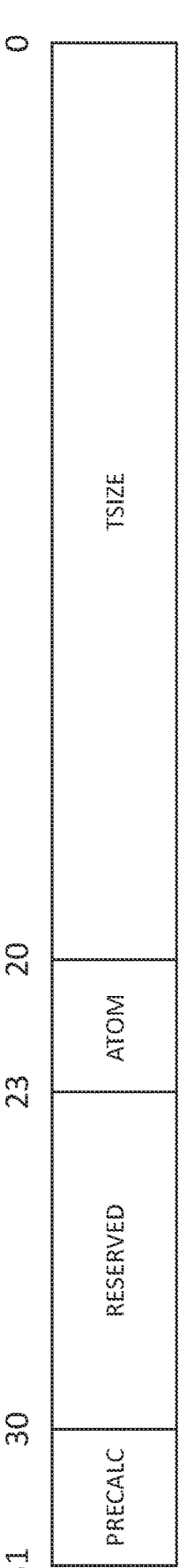
FIG. 10 is an illustration of a control register for the first instruction.

As shown, one of the supervisor control and status registers (CSR) is a RUNALL control register 545. The RUNALL control register 545 stores certain values that are used by the hardware module 520 in response to execution of the RUNALL instruction. Reference is made to FIG. 10, which illustrates the contents of the RUNALL control register 545. This register 545 stores a value (shown as TSIZE) representing the total number of atoms in the input buffer containing the data for the workers. The register 545 stores a value (shown as ATOM) representing the size of each atom of data in the input buffer. The size of each atom is given by two to the power of the value of ATOM. The register 545 stores a value (shown as PRECALC), which selects which calculations are performed by the hardware module 520 in order to determine the location variables for the workers. The PRECALC can be used to specify at least whether interleaved mode applies (in which case the hardware module 520 may determine the location variables in accordance with equations 1 and 3) or whether contiguous mode applies (in which case hardware module 520 may determine the location variables in accordance with equations 5 to 8). As shown, some bits (bits 23 to 29 in the example shown) in the RUNALL control register 545 may be reserved for adding additional functionality.

The hardware module 520 is able to access the values from the RUNALL control register, and in response to the execution of the RUNALL instruction by the execution unit 510 use these values to determine the location variables. The hardware module 520 also accesses the worker ID value for each worker thread, which is located in a register (shown as Worker.$wsr.CTXTID_M1 in FIG. 5), and uses this to determine the location variables. As understood from equations 1 to 8, in order to determine the location variables, the hardware module 520 also makes use of a value representing the number of worker threads. This number (which is six in the examples described, but could be another number) is implicit in the RUNALL instruction itself, since it is inherent in the architecture of the processing device 4.

In response to the execution of a RUNALL instruction, the hardware module 520 examines the mode operation (i.e. PRECALC) to determine whether interleaved or contiguous mode applies. If the interleaved mode applies, the hardware module 520 uses the worker ID value, the atom size, and the input buffer size to determine the input offset and the iteration count for each worker in accordance with equations 1 and 3. If the interleaved mode applies, the hardware module 520 uses the worker ID value, the atom size, and the input buffer size to determine the offset and the iteration count for each worker in accordance with equations 5 to 8. In either case, circuitry of the processing device 4 causes each input offset value to be written to the $m0 registers of the associated worker thread and each iteration count value to be written to the $m1 register of its associated worker thread.

The hardware module 520 also receives an address value from a register (shown as $mVERTEX_BASE) of the MRF 540 associated with the supervisor thread. This address value is a pointer to a structure in the memory 22 that contains a base address for the input buffer and a base address for the output buffer. The base address for the input buffer specifies the starting address value for the input buffer. Likewise, the base address for the output buffer specifies the starting address value for the output buffer. These base address values are the same for all worker threads. The individual input offset value determined for each worker thread by the hardware module 520 is added to the base address value by each worker thread to provide the address of its first atom of data in the input buffer to be accessed. Likewise, the individual output offset value determined for each worker thread by the hardware module 520 is added to the base address value by each worker thread to provide the address of its first atom of data in the output buffer to be accessed. The hardware module 520, in response to the execution of the RUNALL instruction. Causes the pointer to the structure containing these base addresses to be written to a CSR (shown as Worker.$VERTEX_BASE) of each worker thread. During execution, each worker thread then loads the base addresses of the input and output buffers from the location identified by the pointer in its CSR.

As discussed, the main pipeline comprises executions units for performing certain types of operations, including load and store operations, populating the MRF registers 535 in response to the RUNALL instruction, and also performing integer arithmetic operations. The processing device 4 also includes an auxiliary pipeline 550, which comprises an execution unit for perform floating point arithmetic operations on values of data loaded into the arithmetic register files (ARF) 555. The load operations discussed above may be performed to load values from the input buffer to a register of the ARF 555. These values may then be used in arithmetic operations performed by the execution unit of the device 4 to produce result values. The result values are then stored back to the output buffer in the manner described.

The above description described many operations as being performed by a worker thread. Unless specifically stated as being performed by a specific worker thread, all of the operations described as being performed by a worker thread are performed by each of the worker threads, where each worker threads performs the same operations, but operates on its own associated data.

Embodiments have been described above by way of example only.

Figure 11:
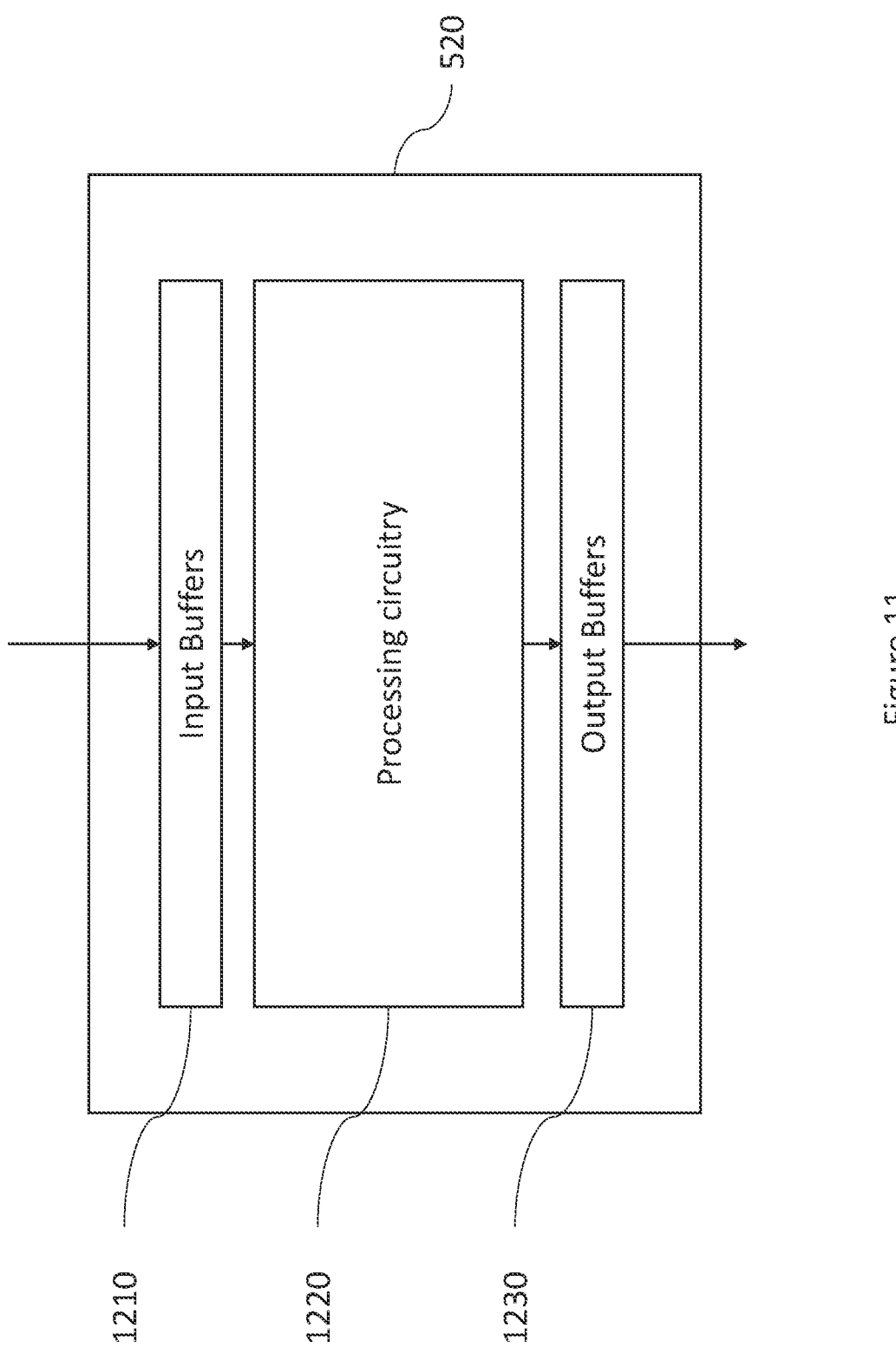
FIG. 11 is a diagram of a hardware module according to embodiments of the application.

Reference is made to FIG. 11, which illustrates an example of the hardware module 520 according to embodiments. The processing circuitry 1220 performs the operations described above as being performed by the hardware module 520. The hardware module 520 comprises one or more input buffers 1210 for receiving the variables (e.g. PRECALC, TSIZE, ATOMSIZE, Worker ID) used for calculating the location variables (e.g. offset and iteration count). These variables are supplied from the input buffers 1210 to the processing circuitry 1220, where they are used to derive the location variables in the manner described above. The processing circuitry 1220 comprises any suitable logic circuitry for this purpose. The hardware module 520 comprises one or more output buffers 1230 for storing the results from the processing performed by the processing circuitry 1220. These results comprise the location variables, which are provided to by circuitry of the processing device 4 to the relevant context registers (e.g. $m0 and $m1) of the processing device 4.

Reference is made to FIG. 12, which illustrates a method 1200 according to example embodiments. The method 1200 enables each of the worker threads to identify locations of its input data in memory.

At S1210, in response to execution of a first instruction, for each the worker threads, in dependence upon an identifier of the respective worker thread, the hardware module 520 determines one or more variables enabling the respective worker thread to locate in the input buffer its set of data on which the operations are to be performed by the respective worker thread.

At S1220, in response to execution of the first instruction, circuitry of the processing device causes at least one of the operand registers that is associated with the respective worker thread to be populated with the one or more variables determined for the respective worker thread. Each of the operand registers is associated with one of the worker threads and is configured to store at least one operand for at least one instruction executed by its associated one of the worker threads.

At S1230, the at least one execution unit Interleaves execution of the plurality of worker threads.

Reference is made to FIG. 13, which illustrates a method 1300 according to example embodiments. The method 1300 enables each of the worker threads to identify locations of at which to store its results data in memory.

At S1310, In response to execution of a first instruction, for each of the worker threads: in dependence upon an identifier of the respective worker thread, the hardware module 520 determines one or more variables enabling the respective worker thread to determine locations in the output buffer to which its respective set of results will be written.

At S1320, in response to execution of the first instruction, the hardware module 520 causes at least one operand register that is associated with the respective worker thread to be populated with the one or more variables determined for the respective worker thread. Each of the operand registers is associated with one of the worker threads and is configured to store at least one operand for at least one instruction executed by its associated one of the worker threads.

At S1330, the at least one execution unit interleaves execution of the plurality of worker threads.

It would be appreciated that embodiments have been described by way of example only.

The invention claimed is:

1. A processing device comprising:

at least one execution unit configured to interleave execution of a plurality of worker threads, wherein each of the worker threads is configured to execute a same set of code to perform operations on a different set of data held in an input buffer of a memory of the processing device; and a plurality of operand registers, each of which is associated with one of the worker threads and is configured to store at least one operand for at least one instruction executed by its associated one of the worker threads;

wherein the at least one execution unit comprises a hardware module comprising processing circuitry configured to, in response to a first instruction, which is executed by the at least one execution unit prior to execution of the same set of code by the worker threads, for a first worker thread of the plurality of worker threads:

in dependence upon an identifier of the first worker thread, determine from control information accessible by the hardware module one or more variables enabling the first worker thread to locate in the input buffer a first set of data on which the operations are to be performed by the first worker thread when it executes the same set of code; and cause at least one of the operand registers that is associated with the first worker thread to be preloaded with the one or more variables determined for the first worker thread prior to the first worker thread executing the same set of code, wherein for the first worker thread, the operations comprise a same set of operations executed repeatedly in a loop and the one or more variables comprises an iteration count indicating a number of iterations of the loop to be performed by the first worker thread, wherein the first worker thread is configured to:

execute each iteration of the loop on a different one of a plurality of subsets of the first set of data wherein the processing circuitry is configured to receive a set of input information enabling it to, for the first worker thread, determine the one or more variables for the first worker thread, wherein the set of input information comprises:

a size of the subsets of each of the sets of data with respect to which the worker threads are configured to perform a single iteration of a same subset of the operations performed repeatedly in each loop;

wherein the processing circuitry is further configured to, in response to the first instruction, which is executed by the at least one execution unit prior to execution of the same set of code by the worker threads, for a second worker thread of the plurality of worker threads:

in dependence upon an identifier of the second worker thread, determine from control information accessible by the hardware module one or more variables enabling the second worker thread to locate in the input buffer a first set of data on which the operations are to be performed by the second worker thread when it executes the same set of code; and cause at least one of the operand registers that is associated with the second worker thread to be preloaded with the one or more variables determined for the second worker thread prior to the second worker thread executing the same set of code, wherein for the second worker thread, the operations comprise a same set of operations executed repeatedly in a loop and the one or more variables comprises an iteration count indicating a number of iterations of the loop to be performed by the second worker thread, wherein the second worker thread is configured to:

execute each iteration of the loop on a different one of a plurality of subsets of the second set of data wherein the processing circuitry is configured to receive a set of input information enabling it to, for the second worker thread, determine the one or more variables for the second worker thread, wherein the set of input information comprises:

a size of the subsets of each of the sets of data with respect to which the worker threads are configured to perform a single iteration of a same subset of the operations performed repeatedly in each loop.

2. The processing device of claim 1, wherein for the first worker thread, the one or more variables comprises an offset into the input buffer at which at least one item of the first set of data is stored.

3. The processing device of claim 2, wherein the first worker thread is configured to execute a load instruction to load an item of the first set of data from a memory location given by the offset for the first worker thread.

4. The processing device of claim 2, wherein for the first worker thread:

the at least one item of the first set of data comprises a first item that is to be accessed first in sequence by the first worker thread.

5. The processing device of claim 1, wherein the first worker thread is configured to continue loading data from the input buffer until a number of completed iterations of the loop by the first worker thread matches the iteration count for the first worker thread.

6. The processing device of claim 1, wherein the first worker thread is configured to, when executing the same set of code:

between each iteration of the loop, increment a pointer to point to a starting address of a next one of the subsets of the first set of data.

7. The processing device of claim 1, further comprising a further register storing the control information enabling the processing circuitry to, for the first worker thread, determine the one or more variables for the first worker thread.

8. The processing device of claim 7, wherein the at least one execution unit is configured to, prior to execution of the first instruction, execute a separate instruction to load the control information into the further register.

9. The processing device of claim 1, wherein the set of input information further comprises:

a size of the input buffer in which is stored each of the sets of data for the worker threads.

10. The processing device of claim 9, wherein for the first worker thread, the one or more variables comprises an offset into the input buffer at which at least one item of the first set of data is stored, wherein the processing circuitry is configured to, for the first worker thread:

determine a respective offset in dependence at least upon:
the size of the subsets of each of the sets of data; and
a number of the worker threads.

11. The processing device of claim 1, wherein the processing device comprises a further register storing the control information enabling the processing circuitry to, for the first worker thread, determine the one or more variables for the first worker thread, wherein the set of input information comprises the control information.

12. The processing device of claim 1, wherein the processing circuitry is configured to receive an indication as to one of a set of data layout modes for the input buffer and in dependence upon, the indication of the one of the set of data layout modes, select a set of calculations to be performed in order to determine the one or more variables.

13. The processing device of claim 12, wherein the set of data layout modes include at least one of:

an interleaved mode in which data belonging to different ones of the worker threads is interleaved in the input buffer; and a separated mode in which, for each worker thread, a respective set of data is located in a single contiguous region of the input buffer.

14. The processing device of claim 1, wherein the processing circuitry is configured to, in response to the first instruction, for each of remaining ones of the plurality of worker threads other than the first worker thread:

in dependence upon an identifier of a respective worker thread, determine a respective one or more variables enabling the respective worker thread to locate in the input buffer a set of data on which the operations are to be performed by the respective worker thread; and cause at least one of the operand registers that is associated with the respective worker thread to be populated with the respective one or more variables determined for the respective worker thread.

15. A method comprising:

interleaving execution of a plurality of worker threads, wherein each of the worker threads is configured to execute a same set of code to perform operations on a different set of data held in an input buffer of a memory of a processing device;

in response to a first instruction, which is executed prior to execution of the same set of code by the worker threads, for a first worker thread of the plurality of worker threads:

in dependence upon an identifier of the first worker thread, determining one or more variables enabling the first worker thread to locate in the input buffer a first set of data on which the operations are to be performed by the first worker thread when it executes the same set of code;

causing at least one operand register that is associated with the first worker thread to be preloaded with the one or more variables determined for the first worker thread prior to execution of the same set of code, wherein for the first worker thread, the operations comprise a same set of operations executed repeatedly in a loop and the one or more variables comprises an iteration count indicating a number of iterations of the loop to be performed by the first worker thread;

executing each iteration of the loop on a different one of a plurality of subsets of the first set of data; and receiving a set of input information enabling a determination of the one or more variables for the first worker thread, wherein the set of input information comprises:

a size of the subsets of each of the sets of data with respect to which the worker threads are configured to perform a single iteration of a same subset of the operations performed repeatedly in each loop;

wherein further in response to the first instruction, which is executed prior to execution of the same set of code by the worker threads, for a second worker thread of the plurality of worker threads:

in dependence upon an identifier of the second worker thread, determining one or more variables enabling the second worker thread to locate in the input buffer a second set of data on which the operations are to be performed by the second worker thread when it executes the same set of code;

causing at least one operand register that is associated with the second worker thread to be preloaded with the one or more variables determined for the second worker thread prior to execution of the same set of code, wherein for the second worker thread, the operations comprise a same set of operations executed repeatedly in a loop and the one or more variables comprises an iteration count indicating a number of iterations of the loop to be performed by the second worker thread;

executing each iteration of the loop on a different one of a plurality of subsets of the second set of data; and receiving a set of input information enabling a determination of the one or more variables for the second worker thread, wherein the set of input information comprises:

a size of the subsets of each of the sets of data with respect to which the worker threads are configured to perform a single iteration of a same subset of the operations performed repeatedly in each loop.

16. A non-transitory computer readable medium storing a computer program comprising a set of executable instructions, which when executed by at least one processor causes a method to be performed, the method comprising:

interleaving execution of a plurality of worker threads, wherein each of the worker threads is configured to execute a same set of code to perform operations on a different set of data held in an input buffer of a memory of a processing device; and in response to a first instruction, which is executed prior to execution of the same set of code by the worker threads, for a first worker thread of the plurality of worker threads:

in dependence upon an identifier of the first worker thread, determining one or more variables enabling the first worker thread to locate in the input buffer a first set of data on which the operations are to be performed by the first worker thread when it executes the same set of code;

causing at least one operand register for the first worker thread to be preloaded with the one or more variables determined for the first worker thread prior to execution of the same set of code, wherein for the first worker thread, the operations comprise a same set of operations executed repeatedly in a loop and the one or more variables comprises an iteration count indicating a number of iterations of the loop to be performed by the first worker thread;

executing each iteration of the loop on a different one of a plurality of subsets of the first set of data; and receiving a set of input information enabling a determination of the one or more variables for the first worker thread, wherein the set of input information comprises:

a size of the subsets of each of the sets of data with respect to which the worker threads are configured to perform a single iteration of a same subset of the operations performed repeatedly in each loop, wherein further in response to the first instruction, which is executed prior to execution of the same set of code by the worker threads, for a second worker thread of the plurality of worker threads:

in dependence upon an identifier of the second worker thread, determining one or more variables enabling the second worker thread to locate in the input buffer a second set of data on which the operations are to be performed by the second worker thread when it executes the same set of code;

causing at least one operand register that is associated with the second worker thread to be preloaded with the one or more variables determined for the second worker thread prior to execution of the same set of code, wherein for the second worker thread, the operations comprise a same set of operations executed repeatedly in a loop and the one or more variables comprises an iteration count indicating a number of iterations of the loop to be performed by the second worker thread;

executing each iteration of the loop on a different one of a plurality of subsets of the second set of data; and receiving a set of input information enabling a determination of the one or more variables for the second worker thread, wherein the set of input information comprises:

a size of the subsets of each of the sets of data with respect to which the worker threads are configured to perform a single iteration of a same subset of the operations performed repeatedly in each loop.

17. A processing device comprising:

at least one execution unit configured to interleave execution of a plurality of worker threads, wherein each of the worker threads is configured to:

execute a same set of code to perform operations on a different set of input data to produce a different set of results;

store its set of results from the operations to an output buffer of a memory of the processing device; and a plurality of operand registers, each of which is associated with one of the worker threads and is configured to store at least one operand for at least one instruction executed by its associated one of the worker threads;

wherein the at least one execution unit comprises a hardware module comprising processing circuitry configured to, in response to a first instruction, which is executed by the at least one execution unit prior to execution of the same set of code, for a first worker thread of the plurality of worker threads:

in dependence upon an identifier of the first worker thread, determine from control information accessible by the hardware module one or more variables enabling the first worker thread to determine locations in the output buffer to which a first set of results will be written when the same set of code is executed by the first worker thread;

cause at least one of the operand registers that is associated with the first worker thread to be preloaded with the one or more variables determined for the first worker thread prior to execution of the same set of code, wherein for the first worker thread, the operations comprise a same set of operations executed repeatedly in a loop and the one or more variables comprises an iteration count indicating a number of iterations of the loop to be performed by the first worker thread; and execute each iteration of the loop on a different one of a plurality of subsets of the first set of data wherein the processing circuitry is configured to receive a set of input information enabling it to, for the first worker thread, determine the one or more variables for the first worker thread, wherein the set of input information comprises:

a size of the subsets of each of the sets of data with respect to which the worker threads are configured to perform a single iteration of a same subset of the operations performed repeatedly in each loop, wherein the processing circuitry is further configured to, in response to the first instruction, which is executed by the at least one execution unit prior to execution of the same set of code, for a second worker thread of the plurality of worker threads:

in dependence upon an identifier of the first worker thread, determine from control information accessible by the hardware module one or more variables enabling the second worker thread to determine locations in the output buffer to which a second set of results will be written when the same set of code is executed by the second worker thread;

cause at least one of the operand registers that is associated with the second worker thread to be preloaded with the one or more variables determined for the second worker thread prior to execution of the same set of code, wherein for the second worker thread, the operations comprise a same set of operations executed repeatedly in a loop and the one or more variables comprises an iteration count indicating a number of iterations of the loop to be performed by the second worker thread; and execute each iteration of the loop on a different one of a plurality of subsets of the second set of data wherein the processing circuitry is configured to receive a set of input information enabling it to, for the second worker thread, determine the one or more variables for the second worker thread, wherein the set of input information comprises:

a size of the subsets of each of the sets of data with respect to which the worker threads are configured to perform a single iteration of a same subset of the operations performed repeatedly in each loop.

18. The processing device of claim 17, wherein for the first worker thread, the one or more variables comprises a memory address value enabling the first worker thread to identify one of the locations in the output buffer to which part of the first set of results will be written.

19. The processing device of claim 18, wherein for the first worker thread, the memory address value is an offset value for an item of the input data for the first worker thread, wherein the first worker thread is configured to identify the one of the locations in the output buffer by scaling the memory address value to obtain an offset value into the output buffer.

20. The processing device of claim 19, wherein the first worker thread is configured to execute a store instruction to store an item of the first set of results to a first memory location identified by the offset value for the first worker thread.

21. The processing device of claim 17, wherein the first worker thread is configured to continue storing the first set of results until a number of completed iterations of the loop by the first worker thread matches the iteration count for the first worker thread.

22. The processing device of claim 17, wherein the first worker thread is configured to, when executing the same set of code:

between each iteration of the loop, increment a pointer to point to a starting address of a next part of the memory to which a next subset of the first set of results is to be stored.

23. The processing device of claim 17, wherein the processing device comprises a further register storing the control information enabling the processing circuitry to, for the first worker thread, determine the one or more variables for the first worker thread.

24. The processing device of claim 23, wherein the at least one execution unit is configured to, prior to execution of the first instruction, execute a separate instruction to load the control information into the further register.

25. The processing device of claim 17, wherein the set of input information further comprises:

a size of an input buffer containing each of the different sets of input data.

26. The processing device of claim 25, wherein the processing circuitry is configured to, for the first worker thread:

determine an iteration count in dependence upon the size of the input buffer and a number of the worker threads.

27. The processing device of claim 25, wherein for the first worker thread, the one or more variables comprises a memory address value enabling the first worker thread to identify one of the locations in the output buffer to which part of the first set of results will be written, wherein the processing circuitry is configured to, for the first worker thread: determine the memory address value in dependence at least upon: the size of each of the subsets; and a number of the worker threads.

28. The processing device of claim 25, wherein the processing device comprises a further register storing the control information enabling the processing circuitry to, for the first worker thread, determine the one or more variables for the first worker thread, wherein the set of input information comprises the control information.

29. The processing device of claim 17, wherein the processing circuitry is configured to receive an indication as to one of a set of data layout modes for the output buffer and in dependence upon the indication of the one of the set of data layout modes, select a set of calculations to be performed in order to determine the one or more variables.

30. The processing device of claim 29, wherein the set of data layout modes include at least one of:

an interleaved mode in which the sets of results belonging to different ones of the worker threads are interleaved in the output buffer; and a separated mode in which, for each worker thread, a respective set of results is stored to a single contiguous region of the output buffer.

31. The processing device of claim 17, wherein the at least one execution unit is arranged to run a supervisor thread in addition to the plurality of worker threads, wherein the supervisor thread is configured to execute the first instruction prior to launching of the worker threads.

32. The processing device of claim 31, wherein the first instruction causes the launching of the worker threads.

33. The processing device of claim 17, wherein the execution unit is configured to: execute each of the worker threads in a repeating sequence, the sequence having multiple time slots in which the at least one execution unit is operable to interleave the execution of the worker threads.

34. The processing device of claim 33, wherein the at least one execution unit is arranged to run a supervisor thread in addition to the plurality of worker threads, wherein the supervisor thread is configured to execute the first instruction prior to launching of the worker threads, wherein the execution unit is configured to:

prior to launching of the worker threads, run the supervisor thread in each of the time slots; and in response to execution of the first instruction, enable the supervisor thread to relinquish each of the time slots in which it is running to one of the worker threads.

35. The processing device of claim 17, wherein the at least one execution unit comprises a plurality of execution units, wherein a first of the execution units comprises the hardware module and is configured to execute the first instruction, wherein a second of the execution units is configured to perform arithmetic operations on the set of data loaded from the memory.

36. The processing device of claim 17, wherein the processing circuitry is configured to, in response to the first instruction, for each of remaining ones of the plurality of worker threads other than the first worker thread:

in dependence upon an identifier of a respective worker thread, determine a respective one or more variables enabling the respective worker thread to determine locations in the output buffer to which its respective set of results will be written; and cause at least one of the operand registers that is associated with the respective worker thread to be populated with the respective one or more variables determined for the respective worker thread.

37. A method comprising:

interleaving execution of a plurality of worker threads, wherein each of the worker threads is configured to:

execute a same set of code to perform operations on a different set of input data to produce a different set of results; and store its set of results to an output buffer of a memory of a processing device; and in response to a first instruction, which is executed prior to execution of the same set of code, for a first worker thread of the plurality of worker threads:

in dependence upon an identifier of the first worker thread, determining one or more variables enabling the first worker thread to determine locations in the output buffer to which a first set of results will be written when the first set of code is executed;

causing at least one operand register that is associated with the first worker thread to be preloaded with the one or more variables determined for the first worker thread prior to execution of the same set of code, wherein for the first worker thread, the operations comprise a same set of operations executed repeatedly in a loop and the one or more variables comprises an iteration count indicating a number of iterations of the loop to be performed by the first worker thread;

executing each iteration of the loop on a different one of a plurality of subsets of the first set of data; and receiving a set of input information enabling a determination of the one or more variables for the first worker thread, wherein the set of input information comprises:

a size of the subsets of each of the sets of data with respect to which the worker threads are configured to perform a single iteration of a same subset of the operations performed repeatedly in each loop;

wherein further in response to the first instruction, which is executed prior to execution of the same set of code, for a second worker thread of the plurality of worker threads:

in dependence upon an identifier of the first worker thread, determining one or more variables enabling the first worker thread to determine locations in the output buffer to which a first set of results will be written when the first set of code is executed;

causing at least one operand register that is associated with the first worker thread to be preloaded with the one or more variables determined for the first worker thread prior to execution of the same set of code, wherein for the first worker thread, the operations comprise a same set of operations executed repeatedly in a loop and the one or more variables comprises an iteration count indicating a number of iterations of the loop to be performed by the first worker thread;

executing each iteration of the loop on a different one of a plurality of subsets of the first set of data; and receiving a set of input information enabling a determination of the one or more variables for the first worker thread, wherein the set of input information comprises:

a size of the subsets of each of the sets of data with respect to which the worker threads are configured to perform a single iteration of a same subset of the operations performed repeatedly in each loop.

38. A non-transitory computer readable medium storing a computer program comprising a set of executable instruction which, when executed by at least one processor causes a method to be carried out, the method comprising:

interleaving execution of a plurality of worker threads, wherein each of the worker threads is configured to:

execute a same set of code to perform operations on a different set of input data to produce a different set of results; and store its set of results to an output buffer of a memory of a processing device; and in response to a first instruction, which is executed prior to execution of the same set of code, for a first worker thread of the plurality of worker threads:

in dependence upon an identifier of the first worker thread, determining one or more variables enabling the first worker thread to determine locations in the output buffer to which a first set of results will be written when the first set of code is executed;

causing at least one operand register that is associated with the first worker thread to be preloaded with the one or more variables determined for the first worker thread prior to execution of the same set of code, wherein for the first worker thread, the operations comprise a same set of operations executed repeatedly in a loop and the one or more variables comprises an iteration count indicating a number of iterations of the loop to be performed by the first worker thread;

executing each iteration of the loop on a different one of a plurality of subsets of the first set of data; and receiving a set of input information enabling a determination of the one or more variables for the first worker thread, wherein the set of input information comprises:

a size of the subsets of each of the sets of data with respect to which the worker threads are configured to perform a single iteration of a same subset of the operations performed repeatedly in each loop;

wherein further in response to the first instruction, which is executed prior to execution of the same set of code, for a second worker thread of the plurality of worker threads:

in dependence upon an identifier of the second worker thread, determining one or more variables enabling the second worker thread to determine locations in the output buffer to which a second set of results will be written when the second set of code is executed;

causing at least one operand register that is associated with the second worker thread to be preloaded with the one or more variables determined for the second worker thread prior to execution of the same set of code, wherein for the second worker thread, the operations comprise a same set of operations executed repeatedly in a loop and the one or more variables comprises an iteration count indicating a number of iterations of the loop to be performed by the second worker thread;

executing each iteration of the loop on a different one of a plurality of subsets of the first set of data; and receiving a set of input information enabling a determination of the one or more variables for the second worker thread, wherein the set of input information comprises:

a size of the subsets of each of the sets of data with respect to which the worker threads are configured to perform a single iteration of a same subset of the operations performed repeatedly in each loop.

* * * * *